US005737011A

United States Patent [19]
Lukacs

[11] Patent Number: 5,737,011
[45] Date of Patent: Apr. 7, 1998

[54] INFINITELY EXPANDABLE REAL-TIME VIDEO CONFERENCING SYSTEM

[75] Inventor: Michael Edward Lukacs, Ocean Township, Monmouth County, N.J.

[73] Assignee: Bell Communications Research, Inc., Morristown, N.J.

[21] Appl. No.: 434,083

[22] Filed: May 3, 1995

[51] Int. Cl.$^6$ .................................................. H04N 7/14
[52] U.S. Cl. ............................ 348/15; 348/585; 348/590
[58] Field of Search ................................ 348/15, 14, 17, 348/584–587, 590–593, 596, 598, 599, 16; H04N 7/14

[56] References Cited

U.S. PATENT DOCUMENTS

| | | | |
|---|---|---|---|
| 4,004,084 | 1/1977 | Brown et al. | 358/133 |
| 4,814,884 | 3/1989 | Johnson et al. | 358/183 |
| 5,187,571 | 2/1993 | Braun et al. | 358/85 |
| 5,325,194 | 6/1994 | Natori et al. | 348/15 |
| 5,353,068 | 10/1994 | Moriwake | 348/585 |
| 5,382,972 | 1/1995 | Kannes | 348/15 |
| 5,408,261 | 4/1995 | Kamata et al. | 348/15 |

OTHER PUBLICATIONS

E. J. Addeo et al., "Personal Multi–Media Multi–Point Communication Service for Broadband Networks," GLOBECOM'88, pp. 53–57, 1988.
E. J. Addeo et al., "A Multi–Media Multi–Point Communication Service Capability for Broadband Networks," IEEE Proceedings of ISS, 1987, pp. 423–428, Mar. 1987.
S. F. Chang et al., "Compositing Motion–Compensated Video within the Network," Computer Communication Review, vol. 22, No. 3, pp. 16–17, Jul. 1992.
H–D Lin et al., "Video Composition Methods and their Semantics," IEEE ICASSP, pp. 2833–2836, 1991.
L. C. Yun et al., "Architectures for Multi–Source Multi–User Video Compositing," Proc. of ACM Multimedia 93 Conference, pp. 215–223, Aug. 1993.
E. F. Brown et al., "A Continuous Presence Video Conferencing System," National Telecommunications Conference, Conference Record, vol. 3, pp. 34.1.1–34.1.4, Birmingham, Dec. 1978.
S. Sabri et al., "Video Conferencing Systems," Proc. IEEE, vol. 73, No. 4, pp. 671–688, Apr. 1985.
A. B. Larsen et al., "Continuous Presence Video Conferencing at 1.5–6Mb/Sec.," Teleconferencing and Interactive Media University of Wisconsin Extension Center for Interactive Programs, pp. 391–398, 1980.

Primary Examiner—Glenton B. Burgess
Attorney, Agent, or Firm—James W. Falk; Joseph Giordano

[57] ABSTRACT

A video conferencing system and method that uses a central multimedia bridge to combine multimedia signals from a plurality of conference participants into a single composite signal for each participant. The system gives each conference participant the ability to customize their individual display of other participants, including keying in and out selected portions of the display and overlapping displayed images, and the ability to identify individual images in a composed video stream by click and drag operations or the like. The system uses a chain of video composing modules that can be extended as necessary to combine video signal streams from any number of conference participants in real time. Multimedia association software is provided for associating different media types to enhance display and manipulation capabilities for multimedia uses. The system also allows each user to dynamically change who can receive the information they provide to the conference.

9 Claims, 13 Drawing Sheets

INFINITELY EXPANDABLE REAL-TIME VIDEO CONFERENCING SYSTEM

RELATED APPLICATIONS

Reference is made to co-pending D. G. Boyer application Ser. No. 08/434,081, M. E. Lukacs application Ser. No. 08/432,242, and D. G. Boyer-M. E. Lukacs- P. E. Fleisher application Ser. No. 08/434,259, all filed on even date with this application and which disclose and claim related inventions.

BACKGROUND OF THE INVENTION

1. Field of the Invention

The present invention relates to real-time video conferencing. More specifically, the invention relates to a system that facilitates flexible real-time video conferencing among a plurality of users with the capability to be expandable to accommodate an infinite number of users.

2. Description of Related Art

Video teleconferencing occurs when people in different locations send voice and video data to each other in order to simulate having all of the participants present in a single room. Each person in a multi-point conference wants to see all or most of the other participants. Accordingly, the various video streams are presented to each participant in a spatially separate manner, either on separate screens or in separate areas of a single video display. Each of the video conferencing terminals sends a locally generated video image to each of the other participant terminals and receives a video image from each of the other participants. In the prior art, this meant that for a three-way conference, six video streams must be transmitted; for a five-way conference, twenty video streams must be transmitted; for an eight participant conference, fifty-six video streams must be transmitted, and so on. Generally, if N people are holding a televideo conference, then $N \times (N-1)$ transmission channels must be used. Accordingly, the relatively large number of channels used for a video teleconference involving multiple participants becomes prohibitive with the prior art systems.

Furthermore, participants must have a sufficient number of input channels, decoders, and translators (if transmitting different video formats) to receive and display multiple images from different participants. Accordingly, the required number of channels, decoders, and/or translators also becomes prohibitive.

With the prior art systems, video conferencing participants were unable to customize their video display by keying in or out portions of the displayed image, or by making the various images of participants overlap in a natural-looking manner, or place and size images as they like. The participants were also unable to associate video images with other multimedia objects to enhance the variety of conferencing functions that can be enjoyed.

SUMMARY OF THE INVENTION

It is an object of the present invention to provide a flexible real-time video conferencing system for use by a plurality of users in which the required transmission bandwidth to each user is minimized.

It is a further object of the present invention to provide a video conferencing system in which each participant receives just one video (and audio) stream of the bandwidth, encoding and video standard that they desire from a central multimedia bridge.

It is a further object of the present invention to provide a video conferencing service that gives each participant the ability to compose video images of other participants into a fully customized display.

It is a further object of the present invention to provide an infinitely expandable priority driven video composing unit to combine any number of video signals into a single prioritized video stream.

It is a further object of the present invention to provide a method of associating images of a video display in a hierarchal fashion, and of associating multimedia objects together to enhance video conferencing and other multimedia applications.

It is a further object of the present invention to allow each user to dynamically change who can receive the information they provide to the conference.

If is a further object of the present invention to provide the ability to users to identify individual images in a composed video stream by click and drag operations or the like.

Additional objects, advantages and novel features of the invention will be set forth in the description which follows, and will become apparent to those skilled in the art upon reading this description or practicing the invention. The objects and advantages of the invention may be realized and attained by the appended claims.

The present invention is a multi-point multimedia teleconferencing service with customer presentation controls for each participant. An advanced multimedia bridge provides feature rich customer-controlled media (mainly, video and audio) mixing capabilities for each participant. The multimedia bridge is a shared network resource that need not be owned by the users or co-located with them but can be rented on a time slice basis. A "star" network topology is used to connect each user to the server(s). Also available at the central bridging location are coders and decoders of different types, so that customers with different types and brands of equipment will be able to communicate with each other. Central combining eliminates the need for multiple input channels and multiple decoders on each participant's desktop.

Each user receives just one video stream of the bandwidth, encoding and video standard that they desire. All of the transcodings and standards conversions are accomplished at the multimedia bridge. The advanced multimedia bridge gives a user the ability to compose a visual space for himself/herself that is different from the displays of the other conference participants. Because of this "personal" control feature, the present invention will be referred to as a personal presence system (PPS).

The software of the present invention controls and manages the multimedia bridge, sets up and coordinates the conference, and provides easy-to-use human interfaces. Each participant in a multimedia conference using the present invention may arrange the various video images into a display in a way that is pleasing to them, and rearrange them at any time during the session.

To arrange their display, the conference participants can move and scale the video images and overlap them in a prioritized manner similar to a windowed workstation display. A user can select any of the images that appear on their video display for an operation on that image. The user's pointing device (e.g., mouse) can be used to move or resize an image, in an analogous way to the "click and drag" operations supported by PC Window environments. The present invention brings this unprecedented capability to the video work space. Additionally, various elements of each image, such as a person or a chart, can be "keyed" in or out of the image so that the elements desired can be assembled in a more natural manner, unrestricted by rectangular boundaries.

The present invention also provides a presentation control capability that allows users to "associate" multimedia streams with each other thereby enabling the creation of composite or object groups. The multimedia association feature can be used to provide joint reception and synchronization of audio and video, or the delivery of picture slides synchronized with a recorded audio. A multimedia provider can use this feature to synchronize information from different servers to deal with information storage capacity limitations or with the copyright constraints on certain information.

A user can associate different video images in order to compose a video scene. By associating the images being sent by an array of cameras, a panoramic view can be generated and panning of the panoramic view can be supported. Association of different incoming images also enables a teleconferencing user to select for viewing a subset of the other conferees provides a convenient way to access different conferees' images by simply panning left or right on the combined video scene.

In addition, a user can associate audio and video instances together so that when the size of the video instance changes, the volume of the audio instance changes, and when the location of the video instance changes, the stereo pan volume of the audio instance changes.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
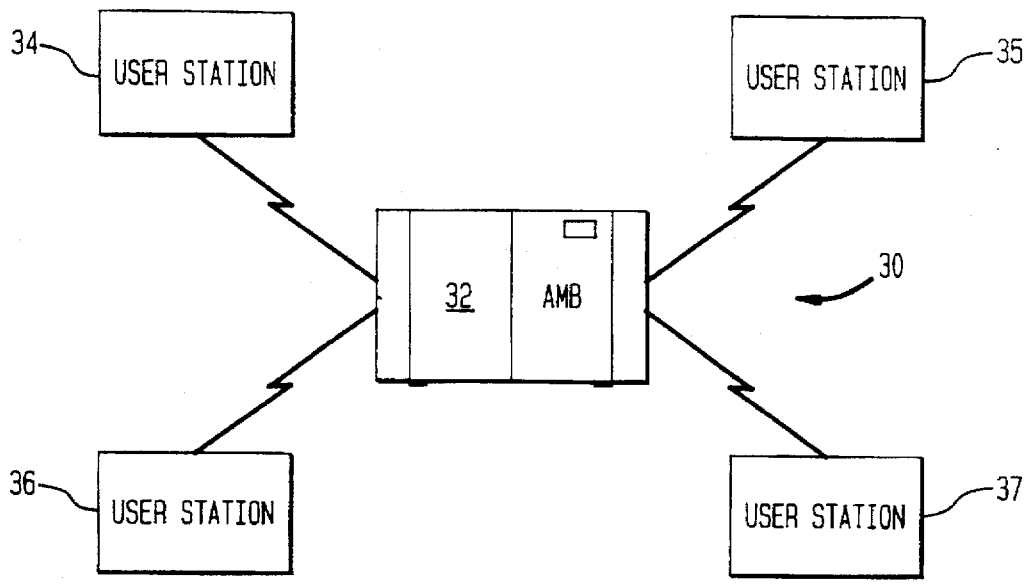
FIG. 1 is a schematic overview of the main components of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring to FIG. 1, a real-time video conferencing system 30 includes an advanced multimedia bridge (AMB) 32 and a plurality of user stations 34–37 which are connected to the AMB 32. The connections between the user stations 34–37 and the AMB 32 can be any one of a variety of conventional electrical/data connections such as telephone modem links, broadband ISDN, etc. Each of the user stations 34–37 transmits and receives video, audio, and/or other data to and from the AMB 32. The AMB 32 is configured to interface with a variety of conventional communication links between the user stations 34–37 and the AMB 32 and is configured to send and receive data to each of the user stations 34–37.

Figure 2:
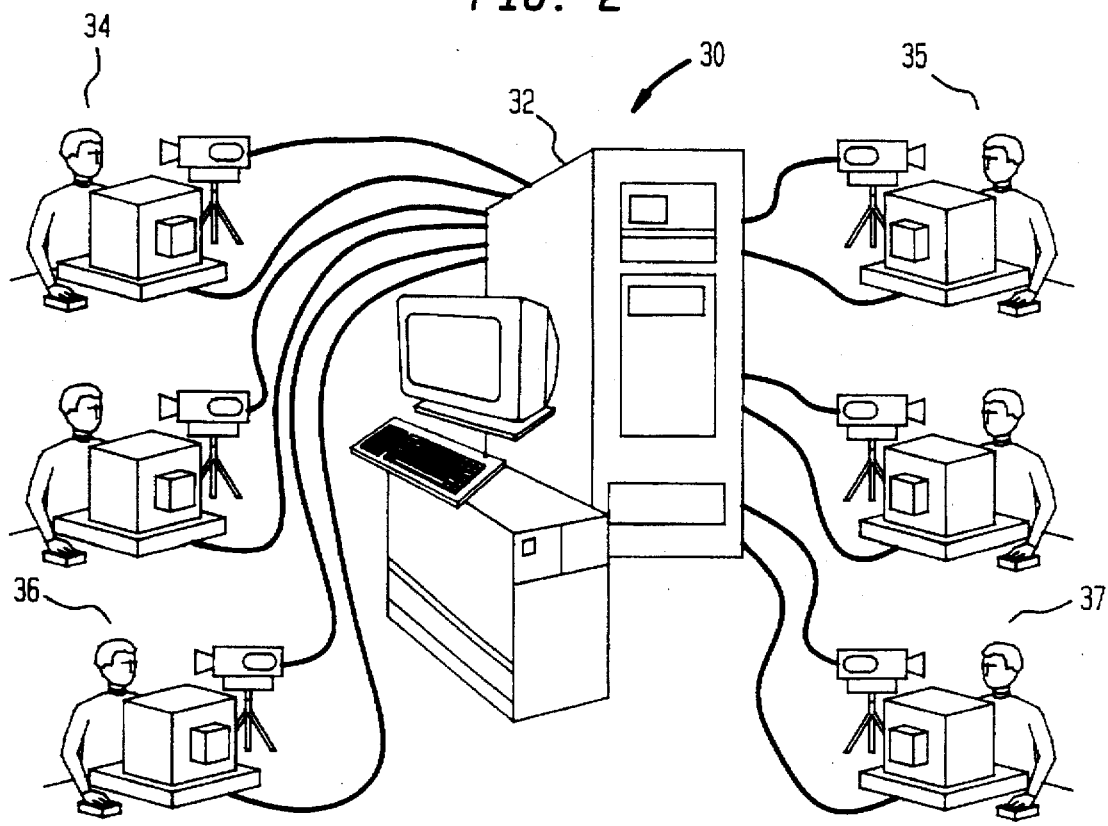
FIG. 2 is a pictorial diagram of a video conferencing session using the present invention.

FIG. 2 shows a video conferencing session using the present invention. Each of the user stations 34–37 may contain one or more users having a video terminal for viewing the teleconference, audio input and output capabilities, and/or one or more video cameras. Data from the video cameras and audio data from the users is transmitted from each of the user stations 34–37 to the AMB 32. The AMB 32 combines and manipulates the data in a manner described in more detail hereinafter and provides a return signal to each of the users at the user stations 34–37.

Figure 3:
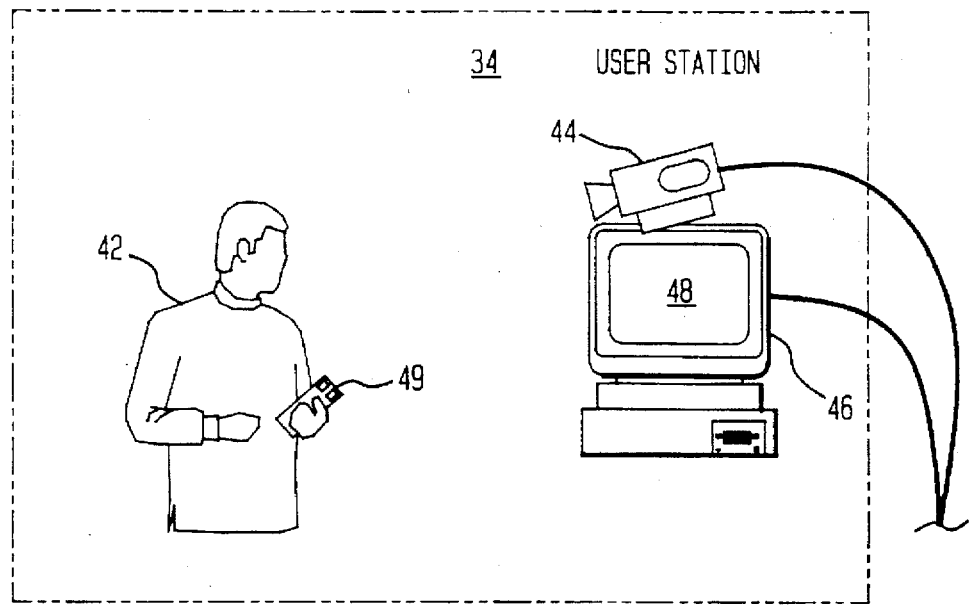
FIG. 3 is a pictorial view of a user station associated with the present invention.

Referring to FIG. 3, the user station 34 of FIG. 1 is shown in greater detail. The user station 34 is illustrated as having a single user 42, a single camera 44, and a single display station 46. The camera 44 and the display station 46 are electrically connected to the communication channel that connects the user station 34 to the AMB 32. The display station 46 has a conventional screen 48 that presents images received from video signals of other user stations 35–37 in a manner described in more detail hereinafter. If the user station includes a television and set-top-box, the user 42 can control the display of the screen 48 with a remote control device 49. If the user station has a PC or workstation, the user can control the video display with a mouse.

Although the user station 34 is shown as having one user 42, one camera 44 and one display terminal 46, it is possible for other user stations 35–37 to have more than one user and/or more than one camera. Moreover, it is possible to use a variety of terminal devices, including stand-alone PCs, network workstations, and even conventional television monitors with the control software (described below) located at a different location. The end user application would run in a set-top-box or a control PC. The specific configuration of the user station 34 shown in FIG. 3 is for illustrative purposes only.

Figure 4:
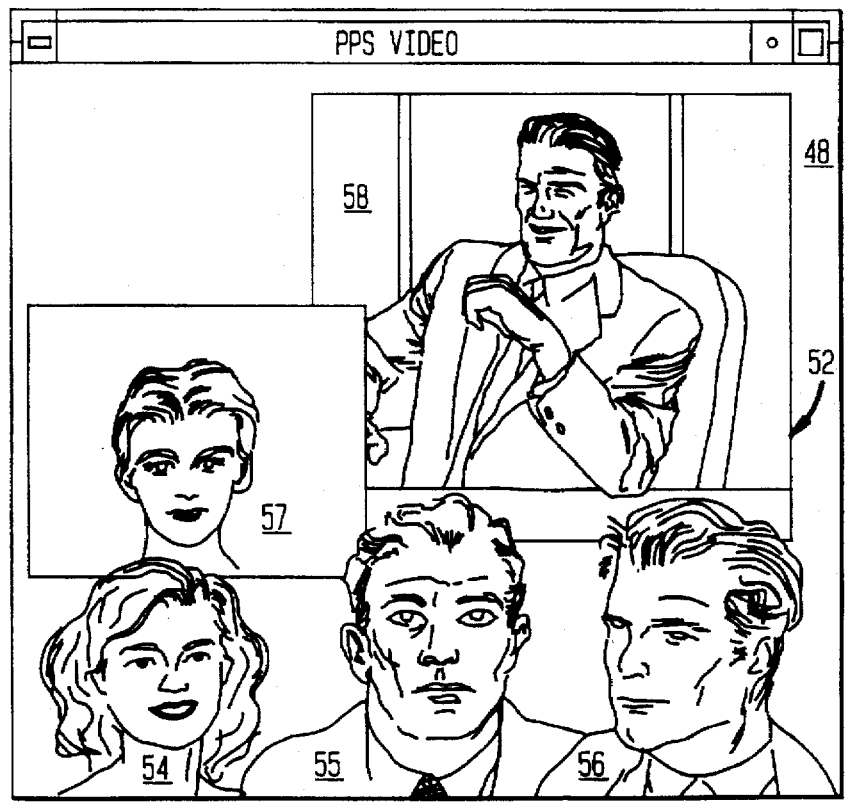
FIG. 4 is an illustration of a sample video display during a video conferencing session using the present invention.

Referring to FIG. 4, the screen 48 of FIG. 3 is shown in more detail. The screen 48 includes a pop-up window 52 showing other participants 54–58 of the video conference. The separate video images from each of the participants 54–58 could be provided to the AMB 32 by separate video signals from other ones of the user stations 35–37. Alternatively, it is possible for some of the participants 54–56 to be in the same room and hence captured by a single video image signal. This would occur if the participants 54–56 are in fact sitting together at a single user station in the manner shown in the window 52. However, it is also possible that the images from each of the participants 54–56 is from a separate video camera. As will be discussed in more detail hereinafter, the AMB 32 can combine the images from the various participants 54–58 in a manner shown in the pop-up window 52 to present the user with a single visual display of the participants of the teleconference, thus creating the illusion that the participants are sitting together at the teleconference.

Figure 5:
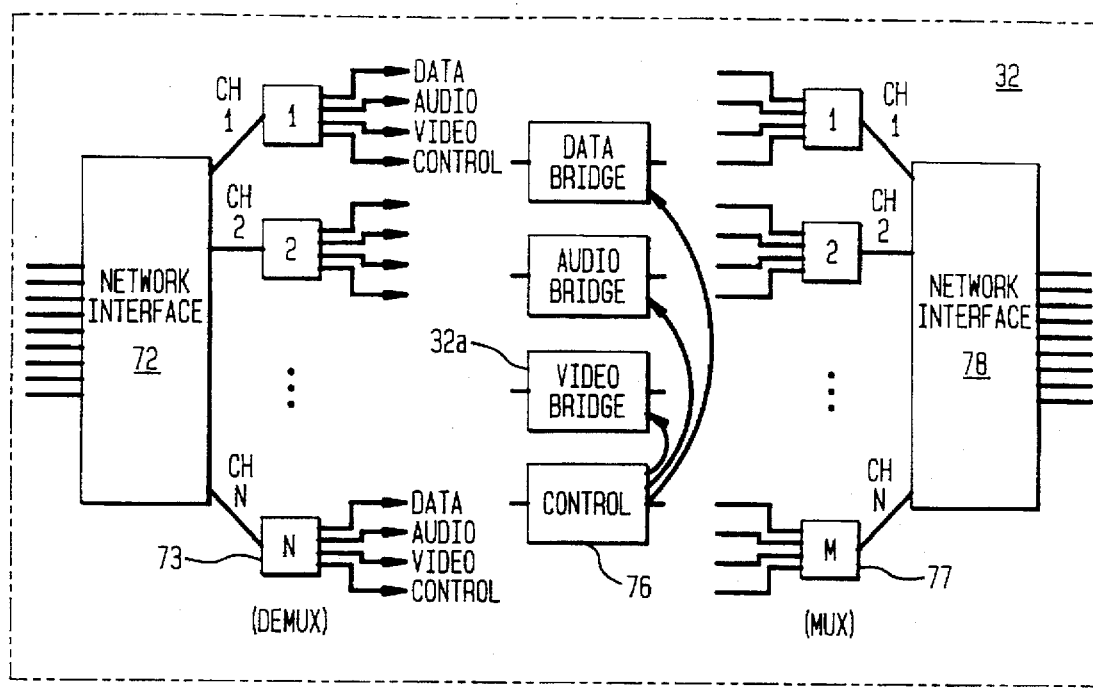
FIG. 5 is a schematic diagram of an advanced multimedia bridge used in the present invention.

Referring to FIG. 5, a schematic diagram illustrates the overall hardware architecture of the AMB 32. The AMB 32 includes network interfaces 72, 78 for handling incoming and outgoing signals from the user stations 34–37. A demultiplexer 73 separates the incoming signals into data, audio, video, and control signals, respectively, and routes the signals to respective data, audio and video bridges, and a control unit 76. The control unit 76, controls the functions of each of the data, audio and video bridges based on control signals and instructions received from the user stations 34–37. A multiplexer unit 77 multiplexes the outgoing signals from each of bridges and the control unit 76 and sends them through the network interface 78 back to the user stations 34–37.

Figure 6:
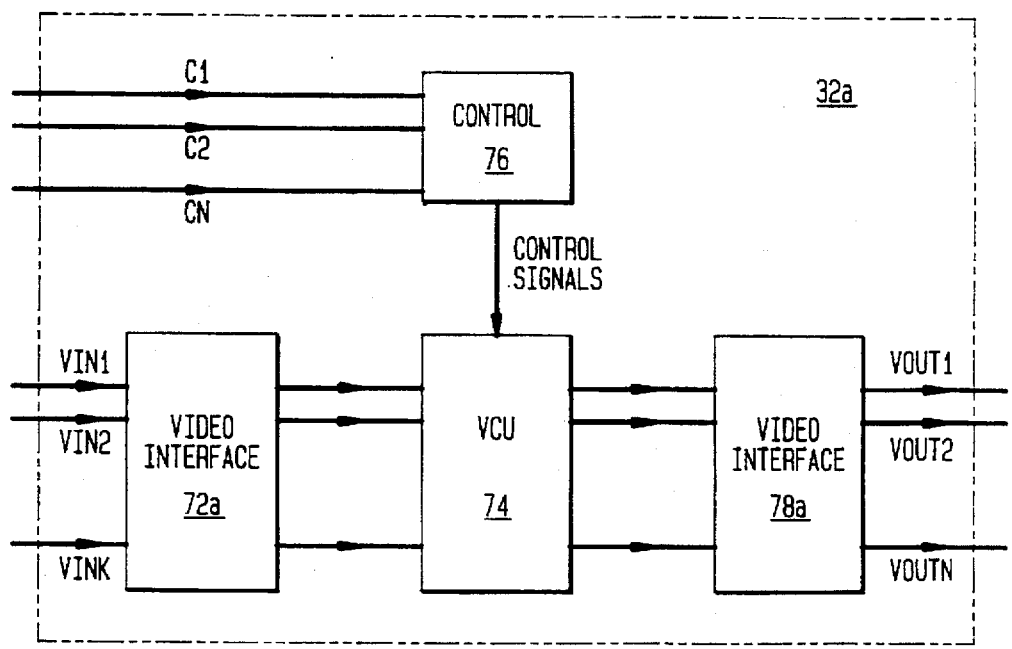
FIG. 6 is a schematic diagram of the video portion of the multimedia bridge of FIG. 5.

Referring to FIG. 6, a schematic diagram illustrates the video portion (AVB) 32a of the AMB 32. The AVB 32a receives control signals C1, C2, ... CN from each of the N users. The AVB 32a also receives video input signals VIN1, VIN2, ... VINK from each of the K cameras located at the user stations 34–37. Note that, as discussed above, the number of cameras does not necessarily equal the number of users. The AVB 32a outputs video signals VOUT1, VOUT2, ... VOUTN to the N users. In a manner discussed in more detail hereinafter, each of the video output signals is controlled by the control inputs from each of the users. For example, the video output signal VOUT1 could represent the video image shown in the pop-up window 52 of FIG. 4. The user viewing the pop-up window 52 can control the contents and presentation of the video signal VOUT1 by providing control signals C1 to the AVB 32a, in a manner discussed in more detail hereinafter.

The video input signals from the camera are provided to the video interface and normalization unit 72a. The video interface unit 72a handles, in a conventional manner, the various communication formats provided by the connections between the AMB 32 and the user stations 34–37. The unit 72a also normalizes the color components of the input video signals so that each picture element ("pel" or "pixel") for each of the video input signals has comparable red, green and blue components. The output signals of the video interface and normalization unit 72a are normalized input video signals.

A video composing unit (VCU) 74 receives the normalized input video signals from the cameras and combines the signals. Also input to the VCU 74 are control signals provided by a control unit 76 which processes the user control signals C1, C2 ... CN, to control the contents and presentation of the output of the VCU 74. Operation of the VCU 74 and the control unit 76 is described in more detail hereinafter. The output of the VCU 74 is a plurality of normalized video signals, each of which contains a video image similar to the one shown in the pop-up window 52 of FIG. 4.

The video interface and denormalization unit 78a receives the outputs from the VCU 74 and provides output signals, VOUT1, VOUT2, VOUTN, to each of the N users. The video interface and denormalization unit 78a denormalizes input video signals to provide an appropriate video output format according to each of the users desires.

Figure 7:
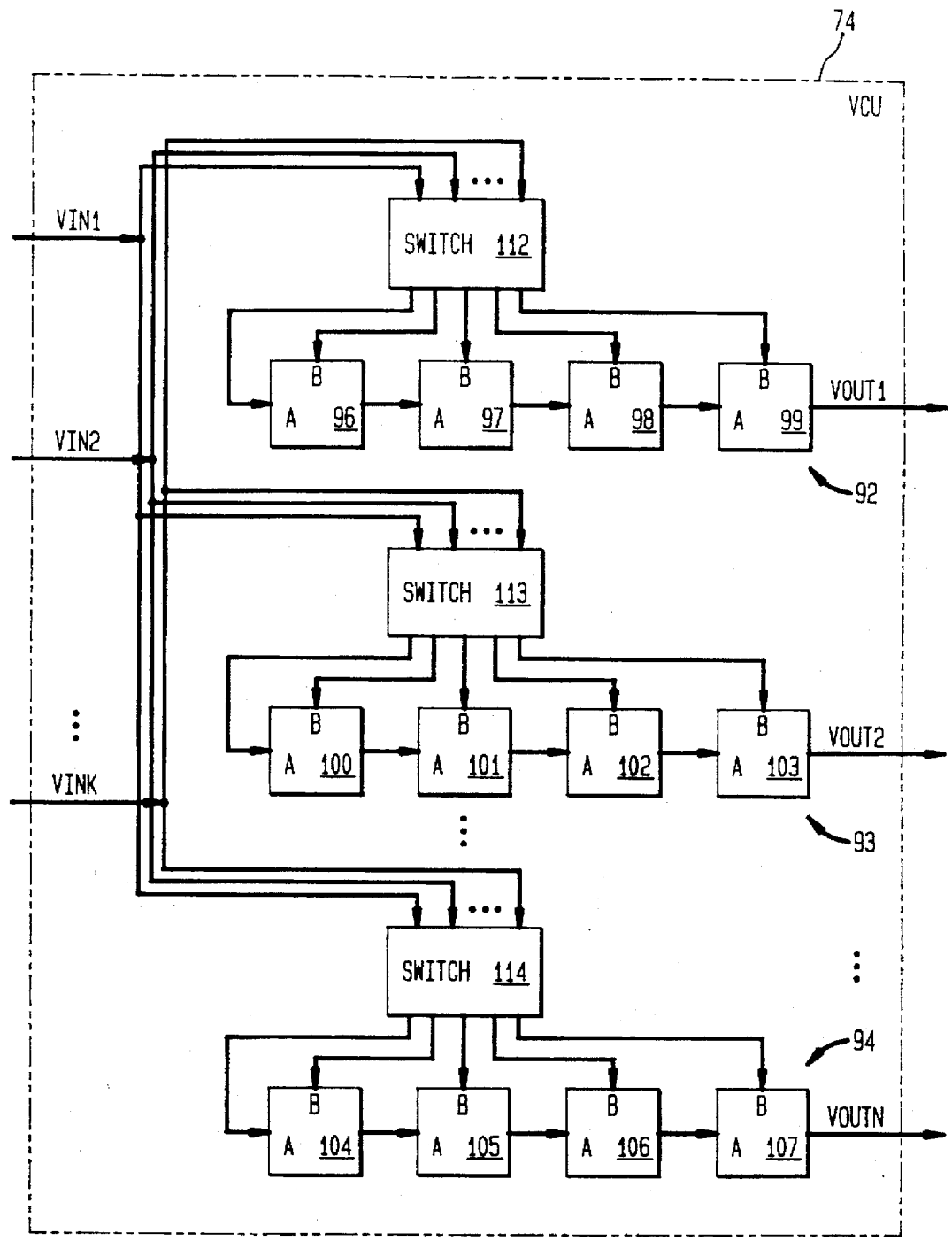
FIG. 7 is a schematic diagram of a video composer unit within the video bridge portion of FIG. 6.

Referring to FIG. 7, a schematic diagram illustrates the VCU 74 in detail. In order to simplify the discussion of FIG. 7, the control inputs and control circuitry of the VCU 74 are not shown in the schematic of FIG. 7.

The VCU 74 is comprised of a plurality of video composing chains (VCCs) 92–94. There is one VCC for each output: VOUT1, VOUT2, ... VOUTN. That is, for a system to support N users, the VCU 74 must have at least N VCCs 92–94.

The VCCs 92–94 are comprised of a plurality of video composing module (VCM) units 96–107. The VCC 92 includes the VCMs 96–99, the VCC 93 includes the VCMs 100–103, and the VCC 94 comprises the VCMs 104–107.

Each of the VCMs 96–107 is identical to each of the other VCMs 96–107. Each of the VCMs 96–107 has an A input and a B input, each of which receives a separate video signal. Each of the VCMs 96–107 superimposes the video signal from the B input onto the video signal of the A input, in a manner described in more detail hereinafter. The output is the result of superimposing the B signal on the A signal.

The inputs to the VCCs 92–94 are provided by switches 112–114, respectively. The inputs to the switches are the video input signals from the cameras VIN1, VIN2, ... VINK. Control signals (not shown in FIG. 7) operate the switches 112–114 so as to provide particular ones of the video input signals to particular inputs of the VCMs 96–107 of the VCCs 92–94. The control signals to the switches 112–114 vary according to the control inputs provided by the users. For example, if the user that is receiving the VOUT1 signal desires to see a particular subset of the video input signals, the user provides the appropriate control signals to the AVB 32a. Control logic (not shown in FIG. 7) actuates the switch 112 so that the switch provides the requested video input signals to the VCMs 96–99 of the VCC 92 that supplies VOUT1.

For the VCU 74 shown in FIG. 7, the VCCs 92–94 are illustrated as having four VCMs 96–99, 100–103, 104–107, respectively, each. Accordingly, each of the VCCs 92–94 is capable of combining five separate video images. This can be illustrated by examining the VCC 92 wherein the VCM 96 receives two of the video inputs and combines those inputs to provide an output. The output of the VCM 96 is provided as the A input to the VCM 97 which receives another video signal at the B input thereof and combines that signal with the A input to provide an output to the VCM 98 which receives the combined input as the A input thereof and receives a new video signal at the B input thereof, combines those signals, and provides an output to the A input of the VCM 99. The VCM 99 receives the combined signal at the A input thereof and a new video signal at the B input thereof, combines the signals, and provides the output VOUT1. It is possible to construct video composing chains having any number of video composing modules other than that shown in FIG. 7. The maximum number of images that can be superimposed is always 1 greater than the number of VCMs in the VCC.

Although FIG. 7 shows the VCCs 92–94 each with four VCMs 96–99, 100–103, 104–107, respectively, hardwired together, it is possible to configure the VCU 74 so that the connections between the VCMs are themselves switched. In that way, it would be possible for a user to request a particular number of VCMs from a pool of available VCMs which would then be wired together by the switches in a customized VCC. The particular switch arrangements used can be conventional, and the implementation of such switch arrangements is within the ordinary skill in the art.

The video composing chains described in FIG. 7 are shown as residing in a central network bridge. It should be understood that these parts of the invention might also be used within some user stations or similar terminal equipment for some of the same purposes as described herein, and therefore that these parts of the invention are not limited to use in a central facility.

Figure 8:
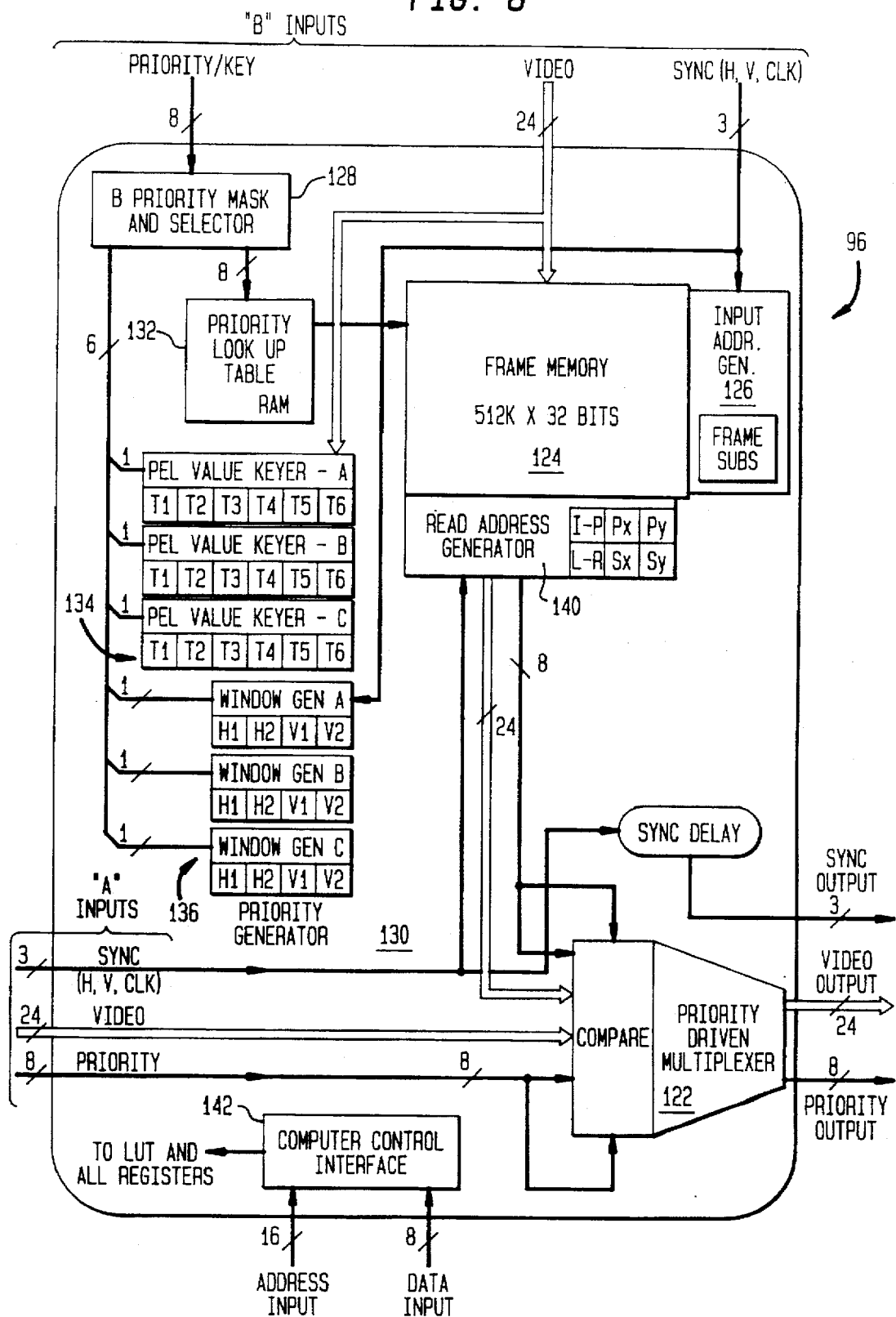
FIG. 8 is a schematic diagram of a video composing module within the video composer chain of FIG. 7.

Referring to FIG. 8, a schematic diagram illustrates in detail one of the VCMs 96 of FIG. 7. As discussed above, the VCMs 96–107 of FIG. 7 are essentially identical and differ only in terms of the inputs provided thereto.

The VCM 96 merges the video data from the A inputs with the video data from the B inputs. For each pel position in the output raster, one pel of data from either the A input or the B input is transferred to the output. The choice of which of the inputs is transferred to the output depends upon the priority assigned to each pel in each of the A and B input video streams.

For the A inputs of the VCM 96 shown in FIG. 8, each pel of the video is shown as having 24-bits each (8-bits each for red, green and blue) and as having 8-bits for the priority. Accordingly, each pel of the A input is represented as a 32-bit value. Similarly, for the B inputs, each pel is represented by a 24-bit video signal (8-bits each for red, green and blue) and an 8-bit priority. Accordingly, just as with the A inputs, each pel of the B inputs is represented by a 32-bit value.

The bit values discussed herein and shown in the drawings are used for purposes of illustration only and should not be taken as limiting the scope of the invention. All of the disclosed bit values for the inputs and outputs to the VCM 96 can be varied without changing the invention. For example, the video inputs and outputs could be 18- or 30-bits, the priority/key inputs and outputs could be 6- or 10-bits, and so forth.

The A video inputs are provided directly to a priority driven multiplexer 122. The B video inputs, on the other hand, are first provided to a 512K×32-bit frame memory 124 which stores the video data and the priority data for the B input video signal. Between the B priority input and the frame memory is a flexible system of priority masking and generation, described in detail below, which alters the original priority value of the B input. The frame memory 124 can be used to synchronize, offset, mirror, and scale the B video input with respect to the A video input.

The output of the frame memory 124 is provided to the priority driven multiplexer 122. Accordingly, the priority driven multiplexer 122 compares the priority for each pel of the A input with the priority for each pel of the B input from the frame memory 124 and outputs the pel having the higher priority associated therewith. The priority driven multiplexer 122 also outputs the priority of the pel having the highest priority between each pel of the A input and B input.

An input address generator 126 receives the H, V, and clock signals for the B video input. The input address generator 126 stores the 24-bit video portion of each pel of the B input in the frame memory 124 without making any significant modification to the B video input data. That is, the input address generator 126 stores the 24-bit video portion of each pel for the B video input without providing any offset, resizing, or any other image modifications to the B video input. Accordingly, the video portion of the B inputs stored in the frame memory 124 is essentially identical to that provided to the VCM 96.

The 8-bit priority portion of the B video inputs is provided to a B priority mask and selector 128. A priority generator 130 also provides inputs to the B priority mask and selector 128. Operation of the priority generator 130 is described in more detail hereinafter. The B priority mask and selector 128 selects certain bits from the output of the priority generator 130 and the input priority value and provides that output to a priority look-up table (P-LUT) 132. The P-LUT 132 is a 256×8 RAM (or any other compatible size) that maps the 8-bit input thereto into an 8-bit priority value which is stored, on a per pel basis, in the frame memory 124. Values for the priority look-up table 132 are provided to the VCM 96 in the manner discussed in more detail hereinafter.

The sizes of the P-LUT 132 and frame memory 124 can be varied for different maximum video raster formats, such as HDTV, and for different numbers of priority stacking levels, such as 256 (P-LUT=256×8) or 64 (P-LUT=64×6), without changing the invention.

The priority generator 130 generates a priority value for each of the pels of the B video input stored in the frame memory 124. One or more pel value keyer sections 134 provide a priority value for each of the pels according to the value of the 24-bit video signal. That is, the pel value keyer 134 alters the priority of each pel according to the input color and brightness of that pel.

The pel value keyer 134 shown has 3 sections labeled A, B, and C. Each section outputs 1-bit of the priority wherein the bit output equals a digital "1" if a pel falls into the specified color range and equals a digital "0" if the pel falls outside of the specified color range. For example, the pel value keyer-A has 6 values T1–T6 which are loaded with constant values in a manner described in more detail hereinafter. The pel value keyer A examines each pel from the input B video image and determines if the red portion of the pel is between the values of T1 and T2, the green portion is between the values of T3 and T4, and the blue value is between the values of T5 and T6. If all of these conditions hold, that is, if the pel has red, green and blue values that are all between T1 and T2, T3 and T4, and T5 and T6, respectively, then the pel value keyer-A outputs a "1". Otherwise, the pel value keyer-A outputs a "0". The operations of the pel value keyer-B and the pel value keyer-C are similar. In that way, each of the pel value keyers of the pel value keyer unit 134 can separately and independently provide a bit of the priority according to the color value of the input B video pel.

The pel value keyer 134 can be implemented in a conventional manner using digital comparator hardware. For some purposes it may be more useful for the three video channels to carry information in formats other than RGB (red, green, blue), such as conventional YIQ or YUV formats. Such alternate encodings are also usable by the pel value keyer and do not alter its operation other than by altering the color space and the required thresholds.

The priority generator 130 also contains one or more window generation sections 136. The window generation sections 136 each consists of a window generation A part, a window generation B part, and a window generation C part.

Each of the parts operates independently. The window generation part processes the H, V, and clock (CLK) portions of the signal from the B video input and outputs a digital "1" bit or a digital "1" bit depending on the horizontal and vertical location of each of the pels of the B video input. For example, the window generation A part can have 4 separate values for H1, H2, V1 and V2. If the input value indicated by the H input for the B input video signal is between H1 and H2, and the input value indicated by the V input is between V1 and V2, then the window generation A part of the window generation section 136 outputs a digital "1" bit. Otherwise, the window generation A part outputs a digital "1" bit. Each of the window generation parts, window generation A part, window generation B part, and window generation C part, operate independently of each other. The window generation section 136 can be implemented in a conventional manner using digital comparator hardware.

Several window generators 136 and pel-value keyers 134, each producing 1-bit, can in combination define distinct priorities for several objects of various colors in different parts of the picture. The individual output bits are treated as an 8-bit word. This word is defined as a numerical value and used to address the P-LUT 132. Depending upon the contents of the memory of the P-LUT 132 any input can be transformed into any numerical priority output at the full video pel clock rate. This transformation is necessary because the multiplexer 122 passes only the highest priority input at each pel position.

The priority generator 130 needs only to assign different numeric priority values to different windows or objects within the B input video raster. The P-LUT 132 then allows the customer to control the ordering of those priorities. For example, when the customer makes a request by a graphical interaction at the user station 34–37 to raise a particular object or window in his composed scene, the human interface program and hardware control programs convert that request into a reassignment of the numerical priorities attached to that area of the image, raising the priority of the requested object, or lowering the priorities of occluding objects.

The priority generator 130 is illustrated in FIG. 8 as having a pel value keyer section 134 with three independent pel value keyer parts and a window generation section 136 with three separate and independent window generation parts. The number of window generators and pel value keyers can be varied without changing the invention. Further, the number of separate parts used for each of the sections 134, 136 is a design choice based on a variety of functional factors including the number of bits used for the priority, the number of desired independent parts, and other criteria familiar to one of ordinary skill in the art. Accordingly, the invention can be practiced with one or more pel value keyer sections 134 having a number of parts other than three and one or more window generation sections 136 having a number of independent window generation parts other than three.

The 6-bit output of the priority generator 130 is provided to the priority mask and selector 128 which is also provided with the input priority signal from the B video input. Conventional control registers (not shown) determine which 8- of the input 14-bits provided to the priority mask selector 128 will be provided to the priority look-up table 132. Although the output of the priority mask and selector 128 is shown as an 8-bit output, and similarly the input to the priority look-up table 132 is shown as an 8-bit input, the invention can be practiced with any number of bits output for the priority mask and selector 128 and input for the priority look-up table 132. The number of bits selected is a design choice based on a variety of functional factors known to one of ordinary skill in the art, including the number of desired distinct priorities and the amount of priority control desired.

As discussed above, the priority look-up table 132 is a 256×8 RAM which maps the 8-bits provided by the priority mask and selector 128 into an 8-bit value which is provided to the frame memory 124. Accordingly, the priority associated with each pel stored in the frame memory 124 is provided by the priority look-up table 132.

The priority mask and selector 128, priority generator 130 and priority look-up table 132 operate together to provide the priority for each pel of the B video input. As discussed in more detail hereinafter, the priority of the B video inputs can thus be altered in order to provide a variety of effects. For example, if the B video input is provided in a window that has been clipped, the window generation section 136 can be set accordingly so that pels that are outside the clipped window are given a low priority while pels that are inside the clipped window are given a relatively high priority. Similarly, the pel value keyer section 134 can be used to mask out one or more colors so that, for example, a video image of a teleconference participant showing the participant in front of a blue background can be provided as the B video input and the pel value keyer section 134 can be set to mask out the blue background by providing a relatively low priority to pels having a color corresponding to the blue background and a relatively high priority to other pels of the B video input image.

A read address generator 140 reads the B input data from the frame memory 124 and provides the data to the priority driven multiplexer 122. In order to compensate for different video standards being used for the A input and the B input, the read address generator 140 reads the data at a rate corresponding to the rate of data provided via the A video input. That is, the read address generator 140 synchronizes the inputs to the priority driven multiplexer 122 so that the pels from the frame memory 124 arrive simultaneously with corresponding pels from the A video input to the priority driven multiplexer 122.

The read address generator 140 also handles offsets between the A input and B input and any scaling and/or mirroring of the B video input. The requested amount of X and Y offset, amount of magnification or reduction, and any flipping are all provided to the VCM 96 in a manner described in more detail hereinafter.

The read address generator 140 handles offsets by providing the pel data from the frame memory 124 at a specified vertical and horizontal offset from the data from the A video input. For example, if the B video image is to be shifted horizontally 5 pels from the A video input, then the read address generator 140 would wait 5 pels after the left edge of the A video input to provide the left edge of the B video input. Magnification/reduction of the B video image and flipping the B video image are handled in a similar manner. Note that providing an offset to a video image, magnifying or reducing a video image, and flipping a video image are all known to one of ordinary skill in the art and will not be described in more detail herein.

A computer control interface 142 connects the VCM 96 to an external control device such as the control unit 76 shown in FIGS. 5 and 6. The computer control interface 142 has an address input and a data input. The address input is shown as a 16-bit value and the data input is shown in FIG. 8 as an 8-bit value. However, it will be appreciated by one of ordinary skill in the art that the number of bits for the address and the data inputs can be modified and are a design selection that depends on a variety of functional factors familiar to one of ordinary skill in the art.

The address input is used to select different VCMs and various registers within each VCM 96 and to load the priority look-up table 132. Different address inputs load different ones of these elements. The data input is the data that is provided to the various registers and the look-up table 132. Accordingly, a user wishing to provide values to the priority look-up table 132 would simply provide the appropriate address for each of the 256 locations in the priority look-up table 132 illustrated herein and would provide the data that is to be loaded into the look-up table 132. Similarly, the pel value keyer section 134 and/or the window generation section 136 can be loaded via the computer control interface 142 by providing the appropriate address for each of the elements of the pel value keyer 134 or the window generation section 136 and providing the data desired therefor. The VCM 96 is otherwise accessed in a conventional manner and will not be discussed further herein.

The following input parameters are provided to the VCM 96:

| | |
|---|---|
| HBMAX | the number of pixels in the horizontal line of the B video image. |
| HP | the desired horizontal position of the B video image with respect to the A video image. |
| HS | the horizontal scaling to be applied to the B video image. The scaling is defined as the factor by which the B video image shrinks with respect to the A video image. |
| HF | a binary value indicating whether or not to apply horizontal flipping to the video image. That is, when HF equals 1, the image will be flipped to provide a mirror image. |
| VBMAX | the number of pixels in a vertical line of the B video image. |
| VP | the desired vertical position of the B video image with respect to the A video image. |
| VS | the vertical scaling to be applied to the B video image. The scaling is defined as the factor by which the B video image shrinks. |
| VF | a binary value indicate whether to apply vertical flipping to the image (i.e., whether or not to flip the image upside down). |

Software Architecture

Figure 9:
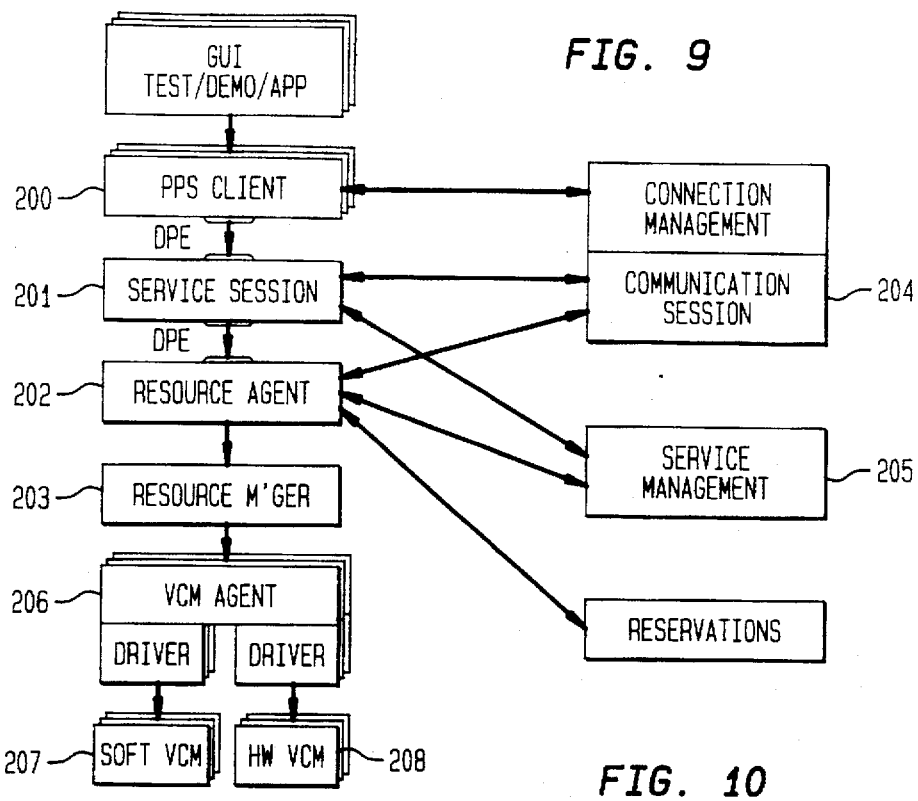
FIG. 9 is a building block diagram of the software components used in the present invention.

FIG. 9 shows a building block diagram of the software products that support the operation of the present invention. The software provides a generic service platform for controlling network-based multimedia bridges. The AVB described above is an example of a video bridge which can be controlled by the service platform. Other video bridges, as well as audio bridges, can also be controlled by this service platform. A remote procedure call (RPC) mechanism of a distributed processing environment (DPE) can be used as the communication mechanism between the PPS clients and the PPS service session module.

A PPS Client program 200 provides an application programming interface (API) that tracks the media objects provided by the local user in the session and the multimedia associations of the received instances of the media. A PPS Service Session program 201 tracks all the users, media objects, the instances in a session, and the multimedia bridges. The PPS Service Session program 201 contacts a network connection manager (not part of PPS, but a necessary core component of any network management environment) to establish connection amongst all the participants. A Resource Agent program 202 reserves the necessary hardware and contacts a network Service Manager 205 (not part of PPS) (discussed below) for billing. Finally, the Resource Manager program 203 configures the hardware and provides feedback, if any.

In addition to the four software components (as mentioned above) that are necessary to manage the PPS service (i.e., the PPS Resource Manager 203, PPS Resource Agent 202, PPS Service Session 201, and Client program 200), a Connection Manager (CM) 204 and a Service Manager 205 form part of the network management environment that supports the PPS Service. The CM 204 is responsible for establishing and maintaining the network connectivity required by the user. The Service Manager 205 is responsible for providing operations support functionality for network services. The Service Manager 205 configures services, provides billing, monitors performance, monitors faults, reports events, etc.

PPS Client Program

The PPS Client 200 communicates with an enduser application at the user stations 34–37 after connectivity is established through the CM 204. The enduser applications include, for example, applications that support multiparty conferencing, distance learning, remote surveillance, remote manufacturing, etc., by presenting an integrated view to the user through a graphical user interface (GUI) at the user stations 34–37.

The Client program 200 supports two primary command types: commands to establish, or change, the network connectivity for the session (commands sent to the CM 204) and commands aimed at controlling the presentation a user receives (signals sent to the PPS Service Session Manager 201 are then sent to the Resource Agent 202).

Figure 10:
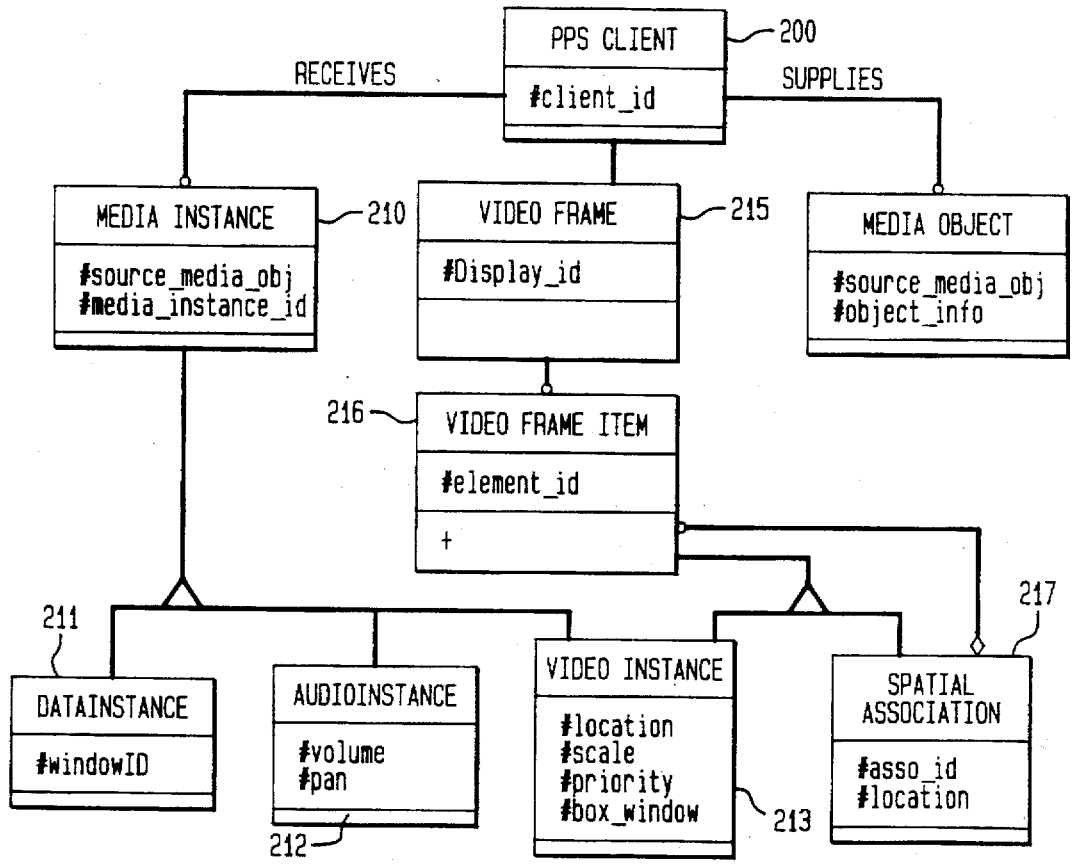
FIG. 10 is an object model diagram of the Client program shown in FIG. 9.

In FIG. 10, the object model for the Client program 200 is shown using Rumbaugh object modeling notation. A one-to-many association is depicted by a line connecting two class boxes with a "dot" on the many-end of the line. An inheritance relationship is represented by a triangle at the intersection of multiple lines. The line connecting to the top of the triangle goes to the superclass.

The PPS Client program 200 keeps track of the media objects that are being supplied by the user that the client is representing. The media instances received by the user are represented by the Media Instance class 210 which is a superclass refined by the data instance 211, audio instance 212, and video instance 213 classes. Each media instance has a unique instID which is generated by the PPS Service Session program 201 and an objectID which identifies which object this instance was generated from. The instID is the handle that gives the Client program 200 access to the VCM 96–107 which is responsible for creating and controlling the video instance.

The Video Frame 215 contains a set of Video Frame Items 216. Spatial associations (one type of multimedia association) can be built from video instances or "smaller" spatial associations. The Video Frame 215 is needed to determine which video instance a user has selected from the video stream he is receiving for a presentation control action. The Video Frame 215 maps the location selected in the video display window to a specific video instance. This is necessary in order to support presentation control signalling which defines an action on a specific image, e.g., resize the instance of user C. The PPS Client program 200 will send a presentation control signal to the Resource Agent 202 that will cause the selected video instance (based on its media_instID) to be displayed in the new way that the user desires.

An action on a spatial association 217, e.g., move association, causes multiple network signals to be sent. For example, when a panning action is requested by the user, the Client program 200 will send separate, correlated, presentation control signals to each of the VCMs 96–107 that are affected by the change in the user's presentation. If two video images are associated together and a pan request is made by the user, the view the user receives of the two images will be shifted. Each of the VCMs 96–107 affected by the change will have the origin of their displayed image shifted.

Service Session

Figure 11:
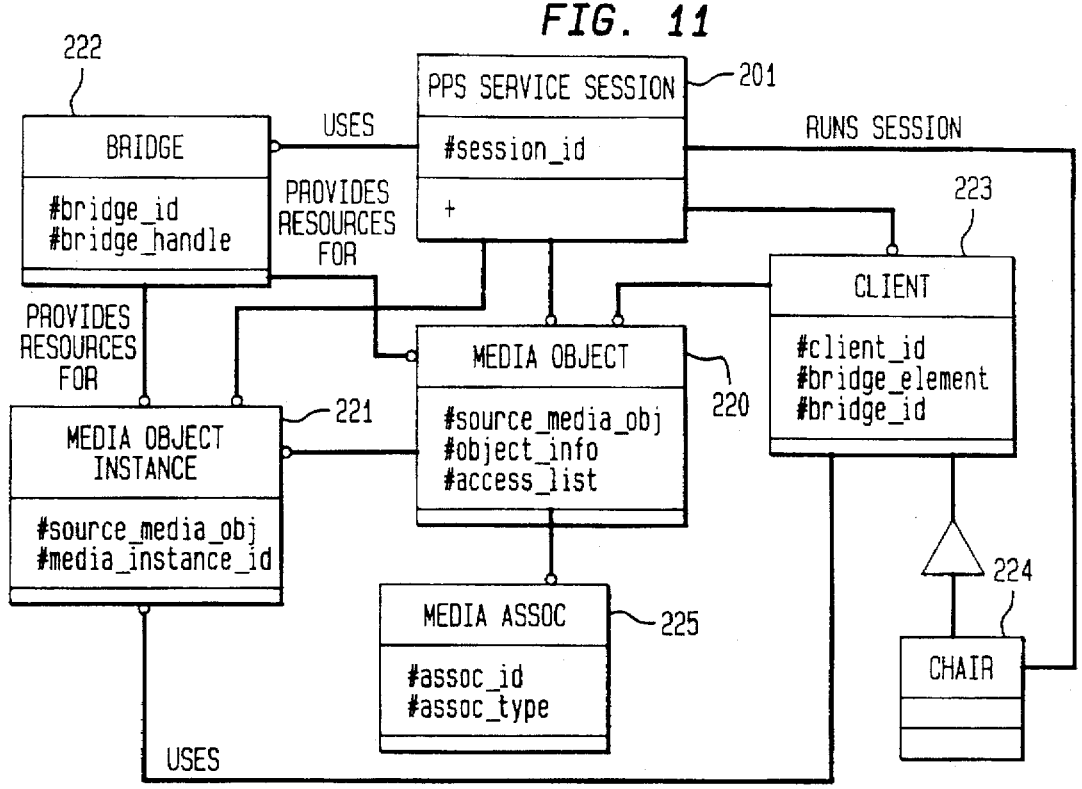
FIG. 11 is an object model diagram of the Service Session program shown in FIG. 9.

In FIG. 11, the object model for the PPS Service Session program 201 is shown. The PPS Service Session base class has its own Media Object class 220 which is different from the one associated with the PPS Client 200, as well as Media Object Instances 221, Bridges 222, and Clients 223. Client information including which video bridge the user is receiving his/her output from and their clientID are stored by each Client object 223.

The Media Object class 220 is used to keep track of all the multimedia objects that are available to participants in this session. The attributes of these objects include what type of object it is (audio, video, data), the owner of the object, the access list for the object, etc. The owner of the object controls which users can be added to the access list for the object. A Chair 224 can also control the access list established by the object owner (override the owner's set-up). A Media Assoc class 225 records the association relationships between the media object for the session level associations.

Media object access control allows a user, or other empowered individual, to determine which other users can receive the media objects that they "own" on a media stream by media stream basis. Media objects that a user sends from his/her site are typically the media objects owned by a user. In the general case, however, ownership of a media object means that a user can control who can access that media object. In a chaired session, for example, the chair of a session may control the access privileges to an object from a different location. A teacher, for example, can control students' access to each other during a test.

The PPS Service Session 201 is responsible for tracking the access permissions of each media object. The access_list parameter of the Media Object class 220 keeps track of the user access permissions. Once the Service Session program has confirmed a user's right to access a media object the user will receive an instance of that media object and a Media Object Instance 221 will be created to reflect the state of this instance in the PPS Client.

When the access permission to a media object changes (e.g., a user wants to prevent other users from viewing his image because he is starting a side-chat) the users who are now restricted from receiving this media object will be notified of the change and have their access to the media object terminated, e.g., their instance(s) of the media object will be removed.

The Bridge class 222 is used to track the resources that have been reserved for use by participants of this session. When a session is created a minimal set of resources may be set-aside for use by the session's participants (e.g., a number of video instances per user or for the session). For example, participants in a session may want to ensure that there are enough resources available so that each user can view (in the case of video) all other participants. Even though the resources have been reserved they may not all be used at a given time during the life of the session. The Bridge class 222 also includes network address information for each bridge so that the Service Session Manager can send the correct signals to the correct bridge.

Resource Management

The Resource Agent 202 is a software component that represents the managed objects of a network resource to the network in a vendor independent fashion. The managed objects represent the state and functionality of the resource. In general, any resource that provides a service in a network will provide two types of interfaces: a service interface that is used by clients of the service, and a management interface that is used by the managing system to manage and control the functionality of the service.

The PPS Resource Agent 202 supports two management interfaces and one service interface. The first interface, which interfaces with the network connection management software, presents a view of the resource to the network that enables the network connection management software to connect transport to the resource. The second interface supports Service Management (e.g., operations support) functionality. The final interface supports the service specific signalling (presentation control signalling) which is necessary to control the resource during a session (PPS Service Session Manager 201 interfaces).

The PPS Resource Agent 202 receives commands sent to it by the CM 204, the PPS Service Session Manager 201, and from the network Service Management managers 205 and translates these commands into internal proprietary commands. The commands and protocols supported by each Resource Agent interface may be different. For example, the interfaces which support the Service Session Manager presentation control signalling may support the RPC protocol, the CM interface, and the Service Management interface may support a CMISE or SNMP interface. The Video Bridge Manager (described below), which receives vendor specific proprietary commands from the Resource Agent 202, is responsible for the internal configuration of the resource.

Figure 12:
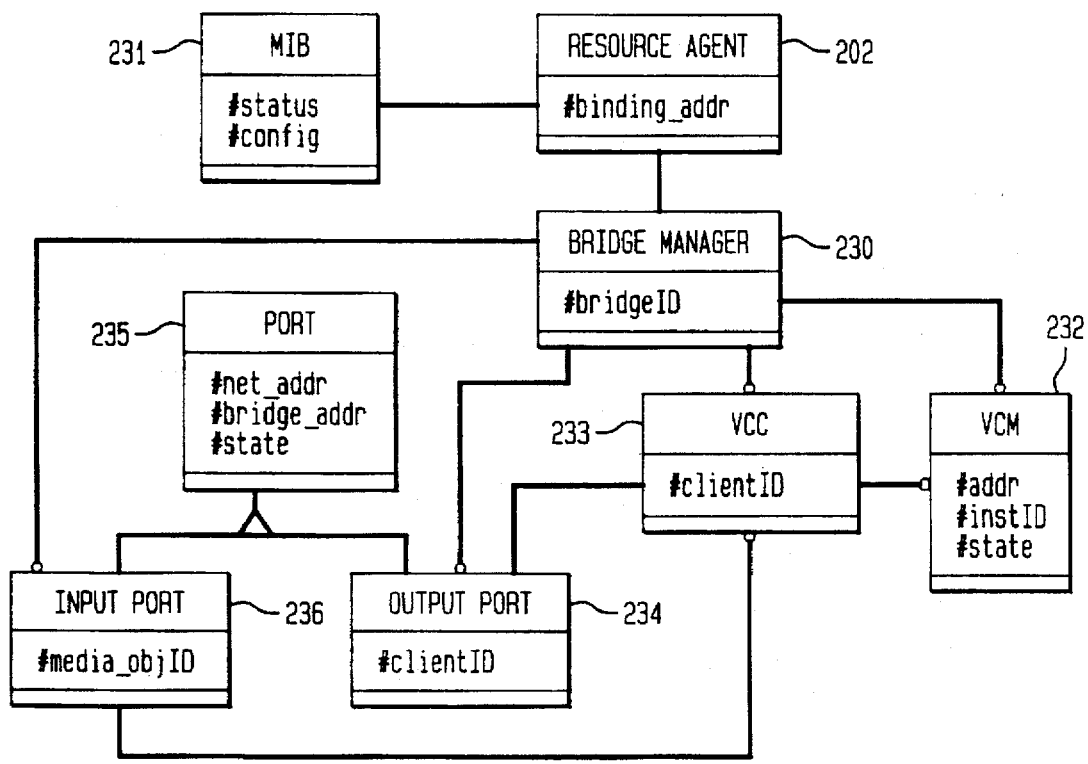
FIG. 12 is an object model diagram of a Bridge manager program used in conjunction with the Resource Agent program shown in FIG. 9.

In FIG. 12, the object model for a Video Resource Management subsystem is shown. Similar object models (not shown) exist for the audio and data resource managers. The video bridge can be viewed by the network as a black box which has input and output ports with certain capabilities (media type supported, bandwidth, QoS, etc.). A Management Info Base (MIB) 231 contains the managed objects that reflect the state and functionality of the AVB 32a in a form understood by the network management software.

Communications between the Video Bridge Manager (VBM) 230 and the Resource Agent 202 are via proprietary commands. The commands sent to the AMB 32, for example, use a command language that is based on the protocol of the computer interface which is used to communicate with the AMB hardware. To communicate with a specific VCM 96–107, the VCM Object 232 that corresponds to the hardware VCM translates a command it receives from the VBM 230 into hardware specific instructions for the VCM type that the command is destined for. The state (windowing/chroma key information, priority information, etc.) of each VCM, e.g., the values stored in the registers of each VCM, is tracked by the VCM Object 232.

The VBM 230 (FIG. 12) is also responsible for the internal configuration of the bridge. The VBM will connect the correct VCMs 96–107 together into a VCC (with a corresponding VCC Object 233) and connect the VCC to the output port 234 for a user. When a new session is requested, VCM and Port objects 232, 235 are queried to determine if the AVB 32a has the resources required for the proposed session. If the State variable is set to Available for a VCM object 232 or Port object 235, it means that the Port or VCM can be used for a new session. If the State is set to Reserved or In-Use, then the Port or VCM is unavailable.

A VCM Agent subsystem 206 (FIG. 9) provides a single interface to the VBM 230 for the control of a hardware VCM or software emulator of a VCM. The VCM Agent subsystem 206 consists of a VCM base class which provides the interface definition and the basic functionality of the VCM. The VCM hardware only provides write access so it is the responsibility of the VCM Agent 206 to store the state of each register in the hardware as well as provide I/O for the VBM 230.

There are two derived classes from the VCM base class, the softVCM 207 and the hardVCM 208. The interfaces for these classes differ only in the constructor. The softVCM 207 takes a string which represents the filename to use to write commands to a softVCM. The hardVCM 208 takes an address value which is the base address of the hardware. This design allows one to use a pointer of type VCM without regard to whether they are using a hardware or software implementation.

Session Initialization

Figure 13:
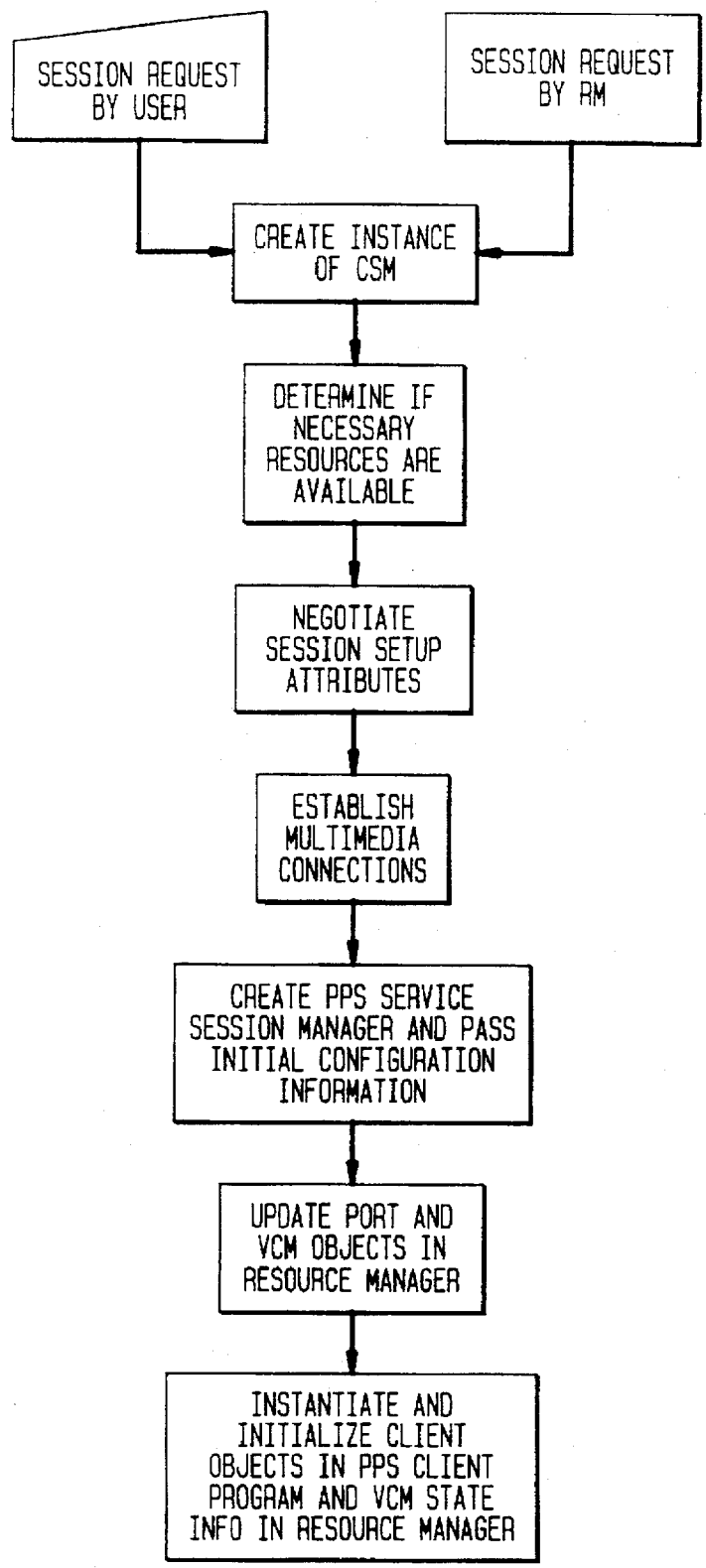
FIG. 13 is a flow chart of a process for establishing a session with the multimedia bridge of the present invention.

FIG. 13 shows the steps for initializing a session with the AVB 32a. Similar steps are required for the audio and data bridges. The initialization begins when an instance of a Connection Manager, or appropriate network management software, is created by a user's request for a spontaneous session or by a request from a Reservation Manager 203. The session is then established by the following steps.

First, the PPS Client program 200 uses the interfaces of the CM 204 to determine if the necessary resources are available to support the requested session. The CM 204 requests resources from the Video Resource Agents 202 which, in turn, will communicate with the VBMs 230 of the Resource Manager 203 to determine if the necessary resources are available.

Second, the CM 204 will handle session setup negotiations that are necessary between the participants. Some of the attributes to be negotiated between a user and the Connection Manager include bandwidth access, quality of service, video rates, video quality, audio quality, session objects to be sent to AMB 32 (a user may be requested to only transmit audio data and they may wish to send video as well), session objects to be received (a user may be restricted to receiving only audio data and may desire to receive video objects as well), etc.

Third, when the session negotiation is completed the multimedia connections to each user will be established by the network Connection Manager. This includes the connection of each user's camera to the video bridge and the connection of the designated output port of the video bridge for each user to the user's terminal.

Fourth, the Connection Manager will notify the PPS Client program that the transport for the session has been set-up. The PPS Client program next creates a PPS Service Session Manager. The PPS Client program passes to the PPS Service Session Manager the initial configuration information for the resources involved in the session. This includes the information concerning which user camera is connected to which input port of the video bridge and which output is responsible for each user's combined video stream.

Fifth, the PPS Service Session Manager causes the Bridge Manager to update the Port and VCM objects (FIG. 12) to indicate what portion of the AVB 32a is being used by the current session by using the service interface of the Resource Agent(s).

Sixth, the Client objects 223 for the session participants are instantiated in the service session and the VCM state information for each VCM are next instantiated and initialized in the resource manager.

Session Operation

During a communication session, users access images, change how the images are received, and add and drop media objects. This process is provided by the Client program (API) 200 interacting with the various software components described above. The PPS Client program has an API to allow application developers access to the PPS programs. An application developer does not need to know the details of the network connection manager, nor does any change need to be made to the PPS network based software to support a new application. A pseudocode listing of this API operation is shown in Appendix A.

For a user to receive an instance of a video object, the user must first request permission to access the object (API command access_obj_request). If a user is given permission to receive an instance of a video object, he specifies the initial location and size of the instance and uses the receive_video_inst API command. The details of this process are preferably hidden from the user by having a single receive image menu item which, when invoked, calls the access_obj_request API command and then calls the receive video instance command.

An initial location and size can be given automatically by the application. The initial location and size of the instance is stored in the Client Video Instance 213 (FIG. 10) so that the location, size, and stacking order of each instance in the combined video stream can be tracked. This is necessary because the video stream sent to the user is a combination of the images the user is receiving and there is no way to determine where each unique image is in this composite video stream. Audio instances are received in a similar fashion.

A presentation control command (move, resize, chroma key, push, pop, change volume, pan, bass, treble, etc.) causes the appropriate client instance to be updated and results in the message being sent to the service session which passes the message on to the appropriate resource manager (audio or video bridge manager). The application must specify the name of the instance that is to receive the command.

A get_instances API command allows an application developer to determine the current settings of the attributes for a media instance. This alleviates the need for each application to track this information. If a user wants to change the volume attribute of an audio instance he is receiving, he needs to know what the current setting is.

For video instances, to better support video click and drag interfaces, selection based presentation control commands are available. The user first clicks on a location in the video window where the instance is located that they wish to perform a presentation control command on. An API pick_items( ) command is invoked and returns a list of instances which are located at the specified location. Since instances can overlap, it is left to the application developer to determine the best way to present this to the user (as a list of the instances, by cycling through and highlighting each instance at the location, etc.). When the user selects the desired instance, an API select_item command is invoked in order to select the instance. Once an instance has been selected, the different presentation control commands can be utilized on the selection by specifying the appropriate API command, e.g., move_selection.

Multiple instances can be selected in order to group them together. For video instances that have been grouped together, the group is treated as if it were a single instance. All presentation control commands can be performed on the group as if it were an individual instance. When a selection command is issued by the application at a given location, if the video instance(s) at the location is in a group, the group information is returned to the application. The individual instance information is not available to the application again until the group has been dissolved. When a presentation command is issued for the group, the PPS Client program unbundles the group and sends individual commands to the components of the video bridge (VCM) responsible for generating each instance. In other words, a separate presentation control signal is sent for each instance in the group to the VCM responsible for generating it.

When a user no longer wishes to receive an instance the drop_media_instance command is issued and the video instance object is deleted from the Client program.

When an object being contributed to the session is disconnected, all instances of the object need to be eliminated as well. The video/audio instance will stop being sent to each of the users who were receiving it.

When a user changes the access permissions to an object that they own, the users who are no longer permitted access to the object have the instances they were receiving of the object removed. The Service Session updates the Client programs appropriately. The program checks to see if the object has been removed from the session or if the access rights for this user have changed.

Multimedia Object Association Control

A significant advantage of the present invention is that it provides session and user level multimedia object associations. User controlled associations between video images and other multimedia objects allow the grouping of different multimedia streams in order to achieve a desired presentation goal. A user may want to associate different video images together in order to compose a video scene. This might be used to associate the images being sent by an array of cameras to give a panoramic view, to give a three-dimensional perspective, or to enable a user to group other users of a teleconference.

Figure 14:
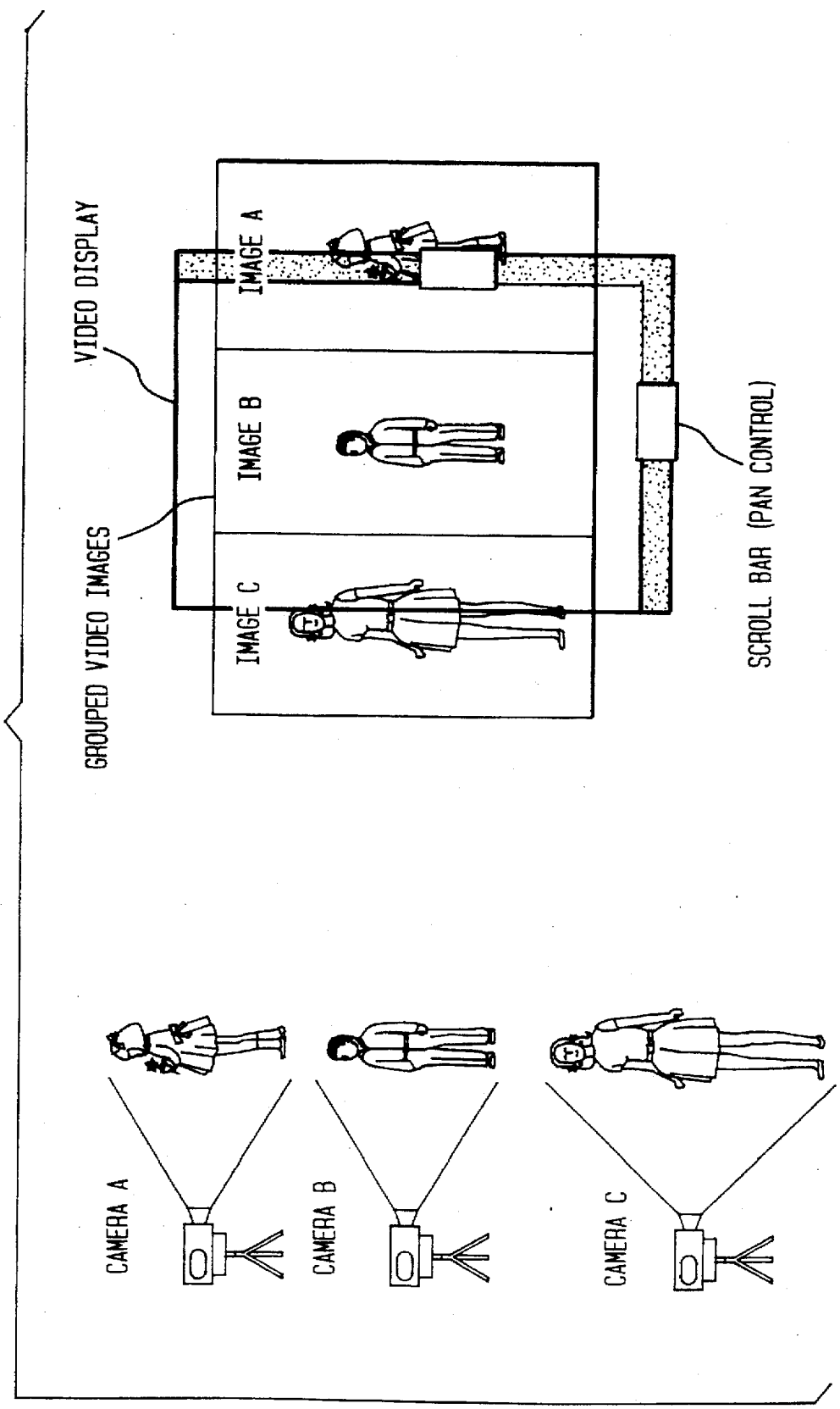
FIG. 14 is a pictorial diagram of a video image association using the present invention.

The teleconferencing user can view a subset of other conferees and conveniently access different conferees' images by simply panning left or right on the combined video scene. For example, in FIG. 14, the video objects that are associated are presented to a user as a scene that can be panned. Images from an array of three cameras are aligned to provide a larger single image (a composite view). The location of the group affects the location of the video instances in the group. If the group is moved, the video instances in the group have their locations offset from the new group location by a pre-established amount.

The multimedia object association software of the present invention can also group together objects of different types. Audio and video objects can be associated together in order to achieve a number of presentation goals. For example, the volume of an audio object can be associated with the size of a video object. If the size of the video object is increased, the volume of the associated audio object is increased. If the size of the video object is decreased, the volume of the audio object is decreased. The two streams of stereo audio can be associated with a video object's location on the display. As the video object is moved to the right of the screen, the right channel of the audio gets louder and the left channel gets softer.

A media association defines the relationship between groups of media objects or instances of the same or different media types in order to create an object group. A media association has attributes which are used to control some or all of the attributes of the instances/objects in the association. A change in a media association attribute will cause the values of specified attributes of the media instances/objects in the association to be changed.

Some associations will require an offset for each instance attribute value, e.g., offset of video instance location from group location. This is necessary because the attribute value of the actual media instance reflects the absolute value for the attribute, e.g., location of video instance on the screen.

Figure 15:
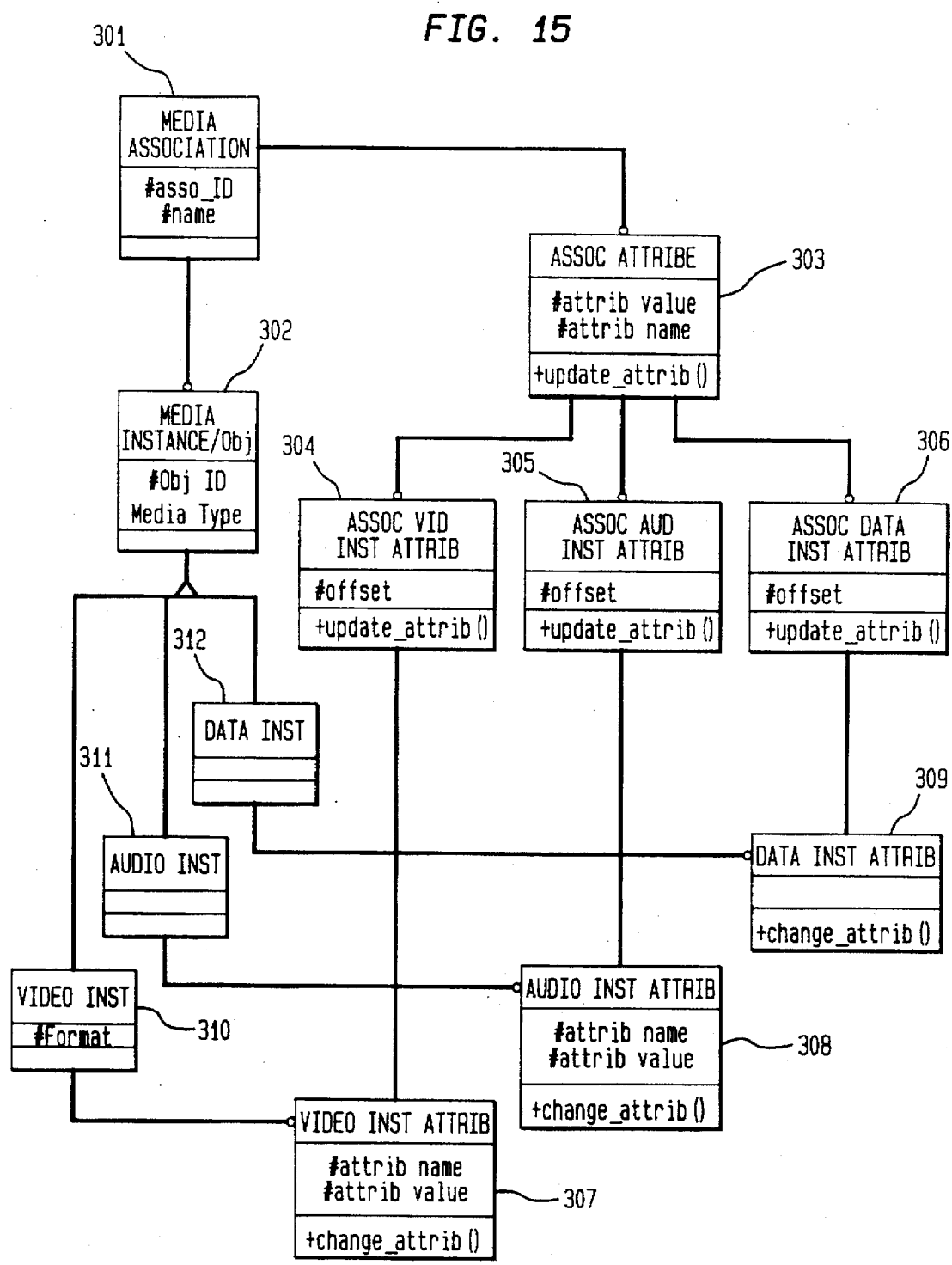
FIG. 15 is an object model diagram of a Multimedia Object Association software architecture used with the present invention.

In FIG. 15, the object model for multimedia associations is presented. A Media Association object 301 has a one-to-many relationship (a line between objects with a "dot" on the many end) with Media Instance/Obj objects 302. That is to say, there are one or more Media Instances in a Multimedia Association. A Media Association also has one or more Assoc Attributes 303. Each of the Assoc Attributes 303, in turn, affects one or more attributes of each instance in the association. Each affected attribute (Video Inst Attrib 307, Audio Inst Attrib 308, Data Inst Attrib 309) is represented in the association by an Assoc Inst attribute (Assoc Vid Inst Attrib 304, Assoc Aud Inst Attrib 305, Assoc Data Inst Attrib 306).

An Assoc Inst attribute defines the relationship of an Inst attribute (Video Inst 310, Audio Inst 311, Data Inst 312) to the association. A location attribute for a video instance (Video Inst 310) will need to have its offset from the group location represented in the association. The Assoc Vid Inst Attrib 304 is utilized for this purpose. Each Assoc Inst Attrib will affect one Inst Attrib (a one-to-one relationship). The Video Inst Attrib 307 for the location case will reflect the actual location of the Video Inst 310 as it appears on the terminal; it is the absolute location of a video instance, not the location relative to a group location as reflected by the Assoc Vid Inst Attrib 304 for location.

User Level Association Examples

Figure 16:
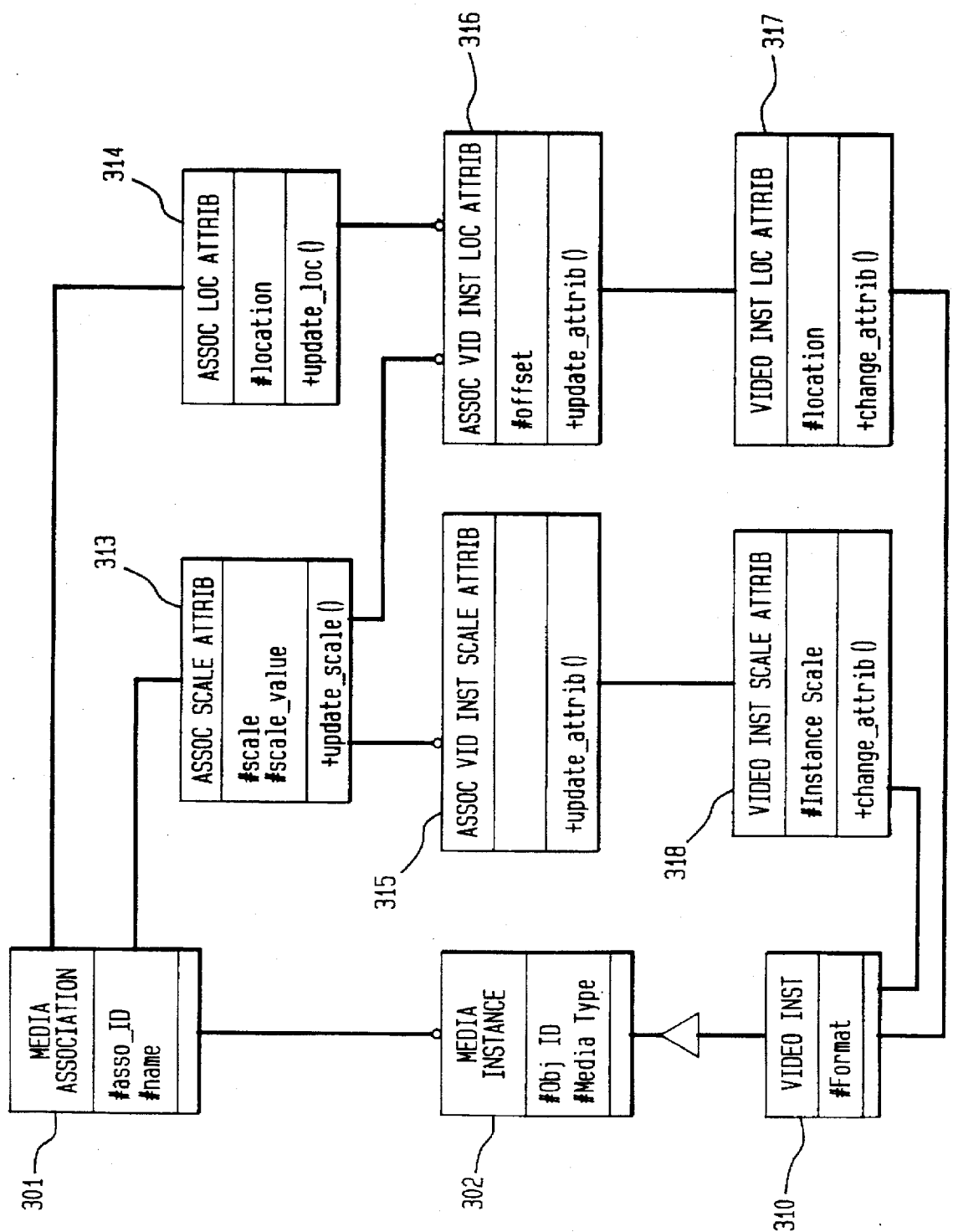
FIG. 16 is an object model diagram showing an example of multimedia object association using video instance group objects.
Figure 17:
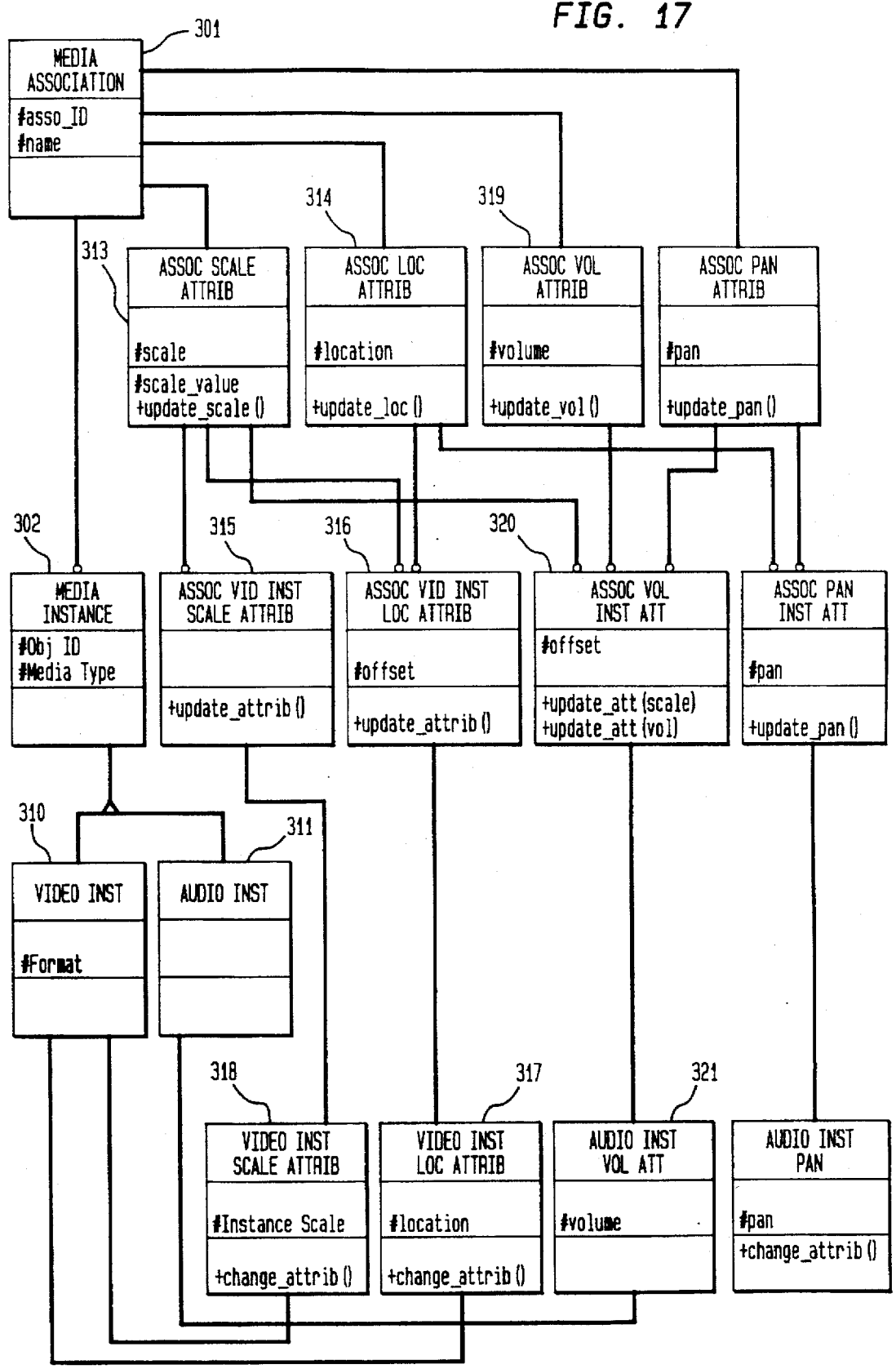
FIG. 17 is an object model diagram showing an example of multimedia object association with video and audio instances associated together.

The Object models shown in FIGS. 16 and 17 show specific user level association examples which are subsets of the general object model presented in FIG. 15. In general, all operations which can be performed on an instance can be performed on an association. For video instance associations, a user can move, scale, prioritize, chroma key, window, and flip the association. Only the components of the general object model of FIG. 15 that are relevant to the examples are shown in FIGS. 16 and 17. It should be noted, however, that the same software is used for the actual realization of all the examples.

EXAMPLE 1

The first example is the case where a user groups a number of video instances together into a video group in order to move all the instances as a scene and to scale the instances as a group (referred to as spatial association). An object model for this example is shown in FIG. 16. This media association only includes video media instances. The media attributes that are associated (media association attributes) are the scale and location of the video instances (Assoc Scale Attrib 313/Assoc Vid Inst Scale Attrib 315 and Assoc Loc Attrib 314/Assoc Vid Inst Loc Attrib 316).

In this example, a change in the location attribute of the association causes the location attribute of the video instances (Video Inst Loc Attrib 317) to be changed by the amount of change to the location of the association. Each video instance has an association location attribute which records the offset of the instance location from the location of the group. The video instance association location attribute member function, update_attrib, when invoked, adds its offset to the group location and, in turn, invokes the change_attrib member function of the video instance location attribute (Video Inst Loc Attrib 317). The actual location of the video instance (Video Inst 310) in the video frame is changed when the video instance location attribute 317 is changed.

A change in the Assoc scale attribute 313 of the media association 301 causes a change in the location and scale of each of the video instances 310.

When the scale of the group is increased, the scale of each of the video instances is increased by the same percentage. The location offset of each instance will also be increased by the same percentage as the change in the group scale. The media association scale attribute 313 in this case will change the scale of each of the video instances as well as the value of the location offset attribute of each instance from the group origin. The video instance scale attribute 318 will not need an association "offset attribute", as is required for the location attribute 317. The association scale attribute 313 member function update_attrib( ) will cause the instance scale attribute 318 to be changed by the same percentage that the group scale was changed.

The object model of FIG. 16 reflecting this example only shows the object model components from the general model (FIG. 15) which are used in this example. The Assoc Attrib objects are separately depicted. In the general model the Assoc Attrib objects are represented in a one-to-many relationship with the Media Association 301.

EXAMPLE 2

In a second example, a user may associate video instances with audio instances so that when the video instance group's scale is resized the audio volume will also change, and when location of the video instance changes, the volume and pan location of the audio will also change. An object model for this association is shown in FIG. 17. In this case, if the scale of the video instance group is increased the audio volume also increases, while if the scale is decreased the audio volume also decreases.

In addition, if the location of the grouped video instances changes, the stereo pan volumes will change for the audio instances, and the overall volume will change for the audio instances. When the video instances are moved to the middle of the screen the volume gets louder, and when the instances are moved to the edge of the screen or off the screen, the audio instance volumes get softer.

The media association 301 has a scale attribute 318 that corresponds to the bounding box of the video instances in the association. When the media association scale is changed, it affects the video instances' scales as in the second example. There is also a media association audio volume level attribute (Audio Inst Vol Att) 321.

Each audio instance volume attribute 321 has a volume "offset" which is added (subtracted) to the group's audio volume attribute to obtain the value for the audio volume of each audio instance. Whenever the audio volume of the associated group is changed, the update_vol member function is invoked and changes all the appropriate audio instance volumes by invoking the update_attrib(vol) member function of the appropriate Assoc Vol Inst Att object 320.

When the scale of the video group is changed, the audio volume of each instance in the association is changed by the same percentage that the video scale attribute is changed. The update_attrib(scale) member function of each Assoc Vol Inst Att object 320 is invoked in order to accomplish this. The audio instance volume levels will be changed by a predetermined percentage. A similar change occurs in the Assoc Vol Inst Att object 320 when the video location attribute changes.

Session Level Object Associations

The primary use of session level associations is for synchronization associations and presentation associations. The specification of synchronization associations is provided by the multimedia association architecture. The tolerable delivery offset is also to be specified. This information is then used by the terminal equipment or the network (assuming it has buffering capabilities) to assure that the media objects are delivered synchronously.

Presentation associations cause all video instances in a group to pop to the foreground when any member of the group is selected. Such association is normally created at the session level, perhaps by a user. The grouping information is then passed on to the Client programs of the interested users.

There are many other media association possibilities supported by the media association architecture. Synchronization, video grouping by role (managers, teachers, etc.), pictures (vu-graphs), etc.

The PPS Client program and the session manager both contain the same software to maintain associations. The session maintains object associations and each Client program controls the instance associations for that user.

Basic Operation Features

Presentation Control

Users of the present invention can arrange their own favorite view in the view window 48 through an easy-to-use (click and drag) human interface. They can choose the pictures they want to see and arrange them the way they like. They can move the pictures to a desired position and scale the pictures to a desired size. They can flip the pictures horizontally and/or vertically.

Figure 18:
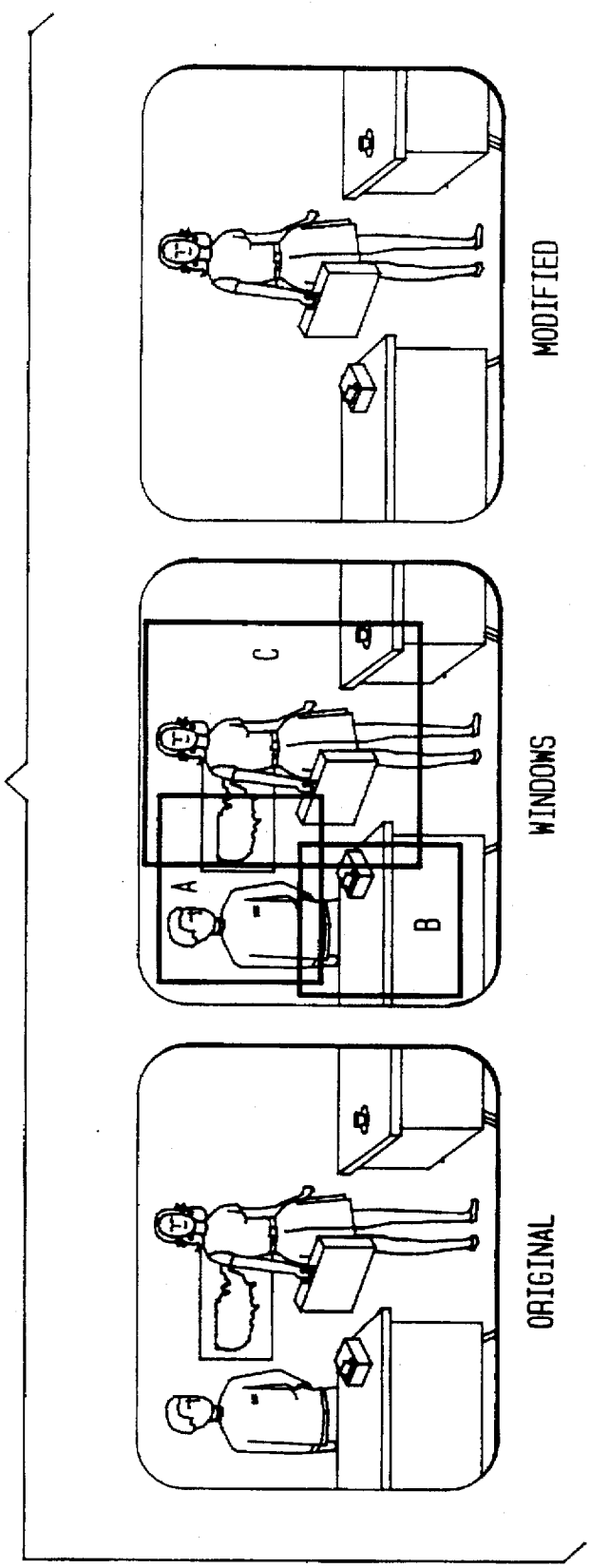
FIG. 18 is a pictorial diagram illustrating a process of keying out a portion of a video display using the present invention.

The user can also cut out part of the pictures by specifying window areas and/or chroma keys. For example, FIG. 18 shows an example of combining the actions of several window and key generators to define an irregular area of an image for extraction. In the example shown, three rectangular window generators 136 (FIG. 8) define windows A, B and C within which selection may be further modified by the settings of the pel-value keyers 134.

Window A is a rough cut of an area to be removed from the final scene. To avoid the necessity for precise location of the bottom edge of window A, window B is used to broadly define a region where only the color of the man's suit is to be removed. Since the irregular border between the map and the female figure could not be defined by a rectangular window, the window C defines another general area within which the particular color of the map is keyed out to complete the separation.

The video portion of the AVB 32a uses a multilevel priority overlap paradigm to determine visibility on a pixel by pixel basis. Therefore the cutout views will continue to overlap each other, and if relative movements bring two person's bodies or heads into contact on the screen, the higher priority image will seem to be naturally passing in front of the other. The ability of each user to control the size, shape, and orientation (facing direction) of each object that is added to the display window naturally blends the differing formats into a pleasing overall picture.

Object Association

User controlled associations between video images and other multimedia objects allow the synchronization of different multimedia streams in order to achieve a presentation goal. Associating media streams with each other allows a user to create what might be thought of as composite or object groups. The objects can be grouped together for easy access and arrangement.

This mechanism can be used to synchronize the delivery of different multimedia streams in order to achieve some presentation goal, e.g., a picture slide show might be synchronized to a recorded presentation from an audio server. A multimedia provider may want to synchronize information from different servers, as the provider may not have the capacity to store all the necessary information, or may not have the copyright to certain information. Object association can also be used to generate a panning effect to simulate panning movement of the video camera and to associate audio and video instances.

Access Control

An access control feature allows each user of the present invention to specify who will be able to access the media objects that they "own." Side-chats are supported by allowing the owner of the media objects to change the access permissions to the media objects. The participants in a side-chat can specify which other users can access their audio and video media objects, and participants not included in the side-chat would be prevented from accessing the media objects that are private to that side-chat.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

APPENDIX A

PSEUDOCODE FOR COMMUNICATION SESSION

```
// create a new session
create_MBSPsession(sessionname, chair_name, duration, client_list);
MBSPend_session( );
// The session chair adds a new user
add_user(client_name);
// The user or the chair drops the user from the session
drop_user(client_name);
// a new media object is added by a user with an initial list
of // the other users who may access this object (Note that the
// user's clientID is added to the command when it is sent to
the // Service session by the PPS Client)
add_media_object(access_name_list, media_type, media_obj_name);
drop_media_object(media_type, media_obj_name);
// Request access permission to an object
access_obj_request(media_obj_name, media_type, media_inst_name);
// If access is granted, receive a video/audio instance with
// specified presentation attributes
receive_video_inst(instID, x_loc, y_loc, x_scale, y_scale);
receive_audio_inst(instID, vol, pan, bass, treble);
drop_media_instance(media_type, inst_name);
// Get a list of the other users that are participating in
this // session
get_clients(ClientList);
// Get a list of the available media objects
get_media_objects(media_type, ObjectList);
// Get a list of the instances being received by the given
user // along with the presentation attributes of the
instances
get_media_instances(media_type, InstanceList);
// Request to join an ongoing session
join_PPSsession(clientID);
// Presentation Control Commands
// Remove a color range from a video instance
key_video_inst(instID, KeyAttribs);
// Move a video instance to a new location
move_video_inst(instID, x, y);
// Raise the video instance specified by the instID to the
front // of the video display (top of the image stacking
order)
raise_video_inst(instID);
// Lower the video instance specified by the instID to the
back // of the video display (bottom of the image stacking
order)
lower_video_inst(instID);
// Give the video instance a new size based on the new scale
```

APPENDIX A-continued

PSEUDOCODE FOR COMMUNICATION SESSION

```
// parameters
resize_video_inst(instID, x_scale, y_scale);
// selection (pick) oriented commands (vs. object oriented,
e.g. // instance (ID) oriented commands. The user picks the
location // on the video display where the instance is they
wish to
// receive. The user then selects one of the instances
located // at the location for further operations.
// Return a list of the items (video instances and/or video
// groups) located at x, y.
pick_items(x, y, ItemList);
// Select the item from the list which has an ID of item_id.
select_item (item_id);
// Move the selected item to the new x, y location
move_selection (x, y);
// Give the selected item (instance or group) a new width and
// length
resize_selection(width, length);
// pop the selected item to the front of the displayed items
pop_selection ( );
// push the selected item to the rear of the stacking order
push_selection ( );
// Chroma key the selected item with the color range specified
in // the KeyAttribs parameter
key_selection(KeyAttribs);
unselect_item( );
// Create a group of the items that have been selected
group_selections( );
ungroup_selection ( );
// Audio presentation control commands
chng_audio_inst_pan(instID, pan);
chng_audio_inst_bass(instID, bass);
chng_audio_inst_treble(instID, treble);
chng_audio_inst_vol(instID, vol);
```

What is claimed is:

1. A video conferencing system comprising a plurality of user stations, at least some of said user stations being equipped with a video camera and a video display device;

a video composing unit in electronic communication with said video cameras and said video display devices for combining a plurality of video signal streams from respective user stations into a combined signal stream and sending the combined signal stream to a respective user station;

said video composing unit comprising a plurality of switches, each receiving video signal streams from individual ones of said use stations and a video composing chain associated with each of said switches, each video composing chain comprising a plurality of video composing modules each having a first and a second input and an output, the first and second inputs of the first video composing module in the chain receiving video signal streams from the associated switch, the first input of succeeding video composing modules in the chain being connected to the output of the preceding video composing module in the chain, the second input of the succeeding modules receiving video signal streams from the associated switch, and the output of the last video composing module in the chain providing the output video signal stream to a user stations; and a control unit in electronic communication with said video composing unit and said user stations, said control unit providing control signals to said video composing unit responsive to command signals received from said user stations, and said video composing unit altering the combined signal streams responsive to said control signals; and wherein each of said video signal streams includes a priority signal portion and a video signal portion, and each of said video composing modules includes a priority driven multiplexing unit for combining two of said video signal streams into a single combined video stream having portions of said two video signal streams with the highest priority.

2. A video conferencing system comprising a plurality of users stations, at least some of said user stations being equipped with a video camera and a video display device;

a video composing unit in electronic communication with said video cameras and said video display devices for combining a plurality of video signal streams from respective user stations into a combined signal stream and sending the combined signal stream to a respective user station;

said video composing unit comprising a plurality of switches, each receiving video signal streams from individual ones of said user stations, a video composing chain associated with each of said switches, each video composing chain comprising a plurality of video composing modules each having a first and a second input and an output, the first and second inputs of the first video composing module in the chain receiving video signal streams from the associated switch, the first input of succeeding video composing modules in the chain being connected to the output of the preceding video composing module in the chain, the second input of the succeeding modules receiving video signal streams from the associated switch, and the output of the last video composing module in the chain providing the output video signal stream to a user station, and each of said video composing modules further comprising a priority driven multiplexer, the first input of the video composing module being directly electronically connected to said multiplexer and the second input of the video composing module being electronically connected to said multiplexer via a priority generator; and a control unit in electronic communication with said video composing unit and said user stations, said control unit providing control signals to said video composing unit responsive to command signals received from said user stations; and said video composing unit altering the combined signal streams responsive to said control signals.

3. The video conferencing system of claim 2, wherein each of said video signal streams includes a video signal portion and a priority signal portion, said multiplexer of each of said video composing modules combining video signal streams from said first and second inputs and outputting a combined video signal stream having picture elements consisting of the highest priority picture elements input to the multiplexer.

4. The video conferencing system of claim 3, wherein said priority generator comprises a picture element value keyer for selectively assigning high and low priorities to the picture elements of the video signal stream based on a color or brightness of the picture element.

5. The video conferencing system of claim 3, wherein said priority generator comprises a window generator for selectively assigning high and low priorities to the picture elements of the video signal stream based on a coordinate position of the picture element on a video display.

6. A video composing unit for combining a plurality of video signal streams into a single combined video signal stream, comprising:

a chain of a plurality of video composing modules each having respective first and second inputs for receiving respective video streams, a multiplexer for combining said respective video streams into a single combined video stream, and an output; and switch means for routing said video stream to said video composing modules;

the first and second inputs of a first one of said video composing modules being electronically connected to respective first and second video streams from said switch means, the first input of a second one of said video composing modules being electronically connected to the output of the first video composing module, and the second input of said second video composing module being electronically connected to a third video stream from said switch means.

7. The video composing module of claim 6, further comprising a third video composing module having its first input electronically connected to the output of the second video composing module and its second input electronically connected to a fourth video stream from said switch means.

8. The video composing module of claim 7, further comprising a fourth video composing module having its first input electronically connected to the output of the third video composing module and its second input electronically connected to a fifth video stream from said switch means.

9. The video composing unit of claim 6, further comprising means for selectively connecting a plurality of said video composing modules together in series to create the video composing chain for combining any desired number of video signal streams.

* * * * *